United States Patent [19]
Fischer

[11] 3,868,245
[45] Feb. 25, 1975

[54] SELECTIVE HERBICIDE MIXTURES OF SUBSTITUTED PHENOXYALKANOIC COMPOUNDS AND 3-ALKYL-2,1,3-BENZOTHIAZINONE-(4)-2,2-DIOXIDES AND PROCESSES

[75] Inventor: Adolf Fischer, Mutterstadt, Germany

[73] Assignee: Badische Anilin- & Soda-Fabrik Aktiengesellschaft, Ludwigshafen, Rhine, Germany

[22] Filed: Apr. 5, 1973

[21] Appl. No.: 348,190

Related U.S. Application Data

[63] Continuation-in-part of Ser. No. 55,277, July 15, 1970, abandoned.

[30] Foreign Application Priority Data
July 24, 1969  Germany............................ 1937551

[52] U.S. Cl.................... 71/91, 71/108, 71/109, 71/110, 71/116, 71/117

[51] Int. Cl............................................. A01n 9/12
[58] Field of Search................................... 71/91, 92

[56] References Cited
UNITED STATES PATENTS

| | | | |
|---|---|---|---|
| 3,708,277 | 1/1973 | Zeidlen.................................. | 71/91 |
| 3,787,198 | 1/1974 | Hagimoto........................ | 71/118 X |

*Primary Examiner*—James O. Thomas, Jr.
*Attorney, Agent, or Firm*—Johnston, Keil, Thompson & Shurtleff

[57] ABSTRACT

Mixtures of herbicidal active ingredients which have a strong selective herbicidal action and particularly suitable for postemergence application, said ingredients including (a) dichlorophenoxyacetic acid, dichlorophenoxy-2-methyl-acetic acid, salts thereof or alkyl or alkoxyalkyl esters thereof and (b) 3-methyl, ethyl, propyl or isopropyl-2,1,3-benzothiadiazinone-(4)-2,2-dioxide or a salt thereof.

8 Claims, No Drawings

SELECTIVE HERBICIDE MIXTURES OF SUBSTITUTED PHENOXYALKANOIC COMPOUNDS AND 3-ALKYL-2,1,3-BENZOTHIAZINONE-(4)-2,2-DIXIDES AND PROCESSES

This application is a continuation-in-part of my copending application Ser. No. 55,277, filed July 15, 1970 now abandoned.

The invention relates to new and valuable herbicides containing mixtures of active ingredients.

It is known to use substituted phenoxycarboxylic acids, diurethanes and benzothiadiazinones as herbicidal active ingredients; however, their action is not satisfactory.

Herbicides comprising a mixture of
a. a compound having the formula

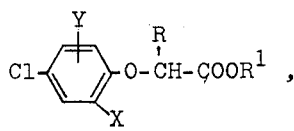

where X denotes chlorine or methyl, Y denotes chlorine or hydrogen, R denotes hydrogen or methyl, and $R^1$ denotes hydrogen, an alkyl radical of 1 to 8 carbons (methyl, ethyl, isooctyl, isobutyl) or an alkoxyalkyl radical of 4 to 8 carbons (butyloxyethyl), or a carboxylic acid salt thereof, and
b. a compound having the formula

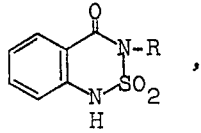

where R denotes methyl, ethyl, propyl or isopropyl, or a salt thereof have a good herbicidal action on broadleaf and grassy weeds when applied postemergence.

Salts of the above compounds include alkali metal (potassium, sodium), alkaline earth metal (calcium, magnesium), amine ($C_1$ to $C_8$) (dimethylamine, diethylamine, methylamine) or alkanolamine ($C_1$ to $C_8$) (diethanolamine, N-methyl-N-ethanolamine, ethanolamine, N,N-diethyl-N-ethanolamine) salts or 2-chloroethyltrimethylammonium salts. The ratio of the active ingredients in the mixture to each other is from 5:1 to 1:5, preferably 3:1 to 1:3. The mixtures are applied to the plants at application rates of 1 to 6 kg per hectare, preferably 2 to 4 kg per hectare.

By postemergence application, we mean the application of the herbicide at a point in time after the seedlings of the crop plants have pierced the surface of the soil. The herbicide may then, for example, be sprayed onto the leaves of the crop plants, onto the unwanted plants or onto the soil (in the loci of the plants). It is not, however, necessary for the seedlings of the unwanted plants to have already emerged.

The agents according to the invention may be used as solutions, emulsions, suspensions or dusts. The form of application depends entirely on the purpose for which the agents are being used; in any case it should ensure a fine distribution of the active ingredient.

For the preparation of solutions to be sprayed direct, hydrocarbons having boiling points higher than 150°C, e.g. tetrahydronaphthalene or alkylated naphthalenes, or organic liquids having boiling points higher than 150°C and having one or more than one functional group, e.g. the keto group, the ether group, the ester group or the amide group, this group or these groups being attached as substituent(s) to a hydrocarbon chain or being a component of a heterocyclic ring, may be used as spray liquids.

Aqueous formulations may be prepared from emulsion concentrates, pastes or wettable powders by adding water. To prepare emulsions the ingredients as such or dissolved in a solvent may be homogenized in water or organic solvents by means of wetting or dispersing agents, e.g. polyethylene oxide adducts. Concentrates which are suitable for dilution with water may be prepared from active ingredient, emulsifying or dispersing agent and possibly solvent.

Dusts may be prepared by mixing or grinding the active ingredients with a solid carrier, e.g. kieselguhr, talc, clay or fertilizers.

EXAMPLE 1

In the greenhouse the plants Zea mays, Hordeum vulgare, Sorghum bicolor, Galium aparine, Stellaria media and Cyperus esculentus were treated at a growth height of 5 to 20 cm with the following amounts of the active ingredients and mixtures thereof listed below:

| | |
|---|---|
| I | 3-propyl-2,1,3-benzothiadiazinone-(4)-2,2-dioxide, 2.0 and 3.0 kg/ha; |
| II | 3-ethyl-2,1,3-benzothiadiazinone-(4)-2,2-dioxide, 1.0 and 3.0 kg/ha; |
| III | 3-methyl-2,1,3-benzothiadiazinone-(4)-2,2-dioxide, 1.5 and 3.0 kg/ha; |
| IV | sodium salt of 3-isopropyl-2,1,3,-benzothiadiazinone-(4)-2,2-dioxide, 3.0 and 4.0 kg/ha; |
| V | 2-chloroethyltrimethylammonium salt of 3-isopropyl-2,1,3-benzothiadiazinone-(4)-2,2-dioxide, 1.5 and 2.0 kg/ha; |
| VI | 2-chloroethyltrimethylammonium salt of 3-ethyl-2,1,3-benzothiadiazinone-(4)-2,2-dioxide; 2.0 and 4.0 kg/ha; |
| VII | triethylammonium salt of 3-propyl-2,1,3-benzothiadiazinone-(4)-2,2-dioxide, 2.0 and 3.0 kg/ha; |
| VIII | sodium salt of 3-ethyl-2,1,3-benzothiadiazinone-(4)-2,2-dioxide, 2.0 and 4.0 kg/ha; |
| IX | sodium salt of 3-propyl-2,1,3-benzothiadiazinone-(4)-2,2-dioxide, 2.0 and 3.0 kg/ha; |
| X | 3-isobutyl-2,1,3-benzothiadiazinone-(4)-2,2-dioxide, 2.0 and 4.0 kg/ha; |
| XI | dimethylamine salt of α-(2,4-dichlorophenoxy)-propionic acid, 1.0 and 3.0 kg/ha; |
| XII | dimethylamine salt of α-(2-methyl-4-chlorophenoxy)-propionic acid, 2.0 and 4.0 kg/ha; |
| XIII | 2,4-dichlorophenoxyacetic acid, 1.5 and 3.0 kg/ha; |
| XIV | sodium salt of 2-methyl-4-chlorophenoxyacetic acid, 1.0 and 4.0 kg/ha; |
| XV | isooctyl 2,4,5-trichlorophenoxypropionate, 0.5 and 2.0 kg/ha; |
| XVI | amyl 2,4,5-trichlorophenoxyacetete, 1.0 and 3.0 kg/ha; |
| I + XI | 2.0 + 1.0 kg/ha; |
| II + XIII | 1.0 + 2.0 kg/ha; |
| III + XIII | 1.5 + 1.5 kg/ha; |
| IV + XIV | 3.0 + 1.0 kg/ha; |
| V + XV | 1.5 + 0.5 kg/ha; |
| VI + XII | 2.0 + 2.0 kg/ha; |
| VII + XVI | 2.0 + 1.0 kg/ha; |
| IX + XI | 2.0 + 1.0 kg/ha. |

Each individual active ingredient and mixture thereof was dispersed or emulsified in 500 liters of water per hectare.

After 8 to 10 days it was ascertained that the mixtures had a herbicidal action superior to that of the individual active ingredients. The results of the experiment after 2 weeks are given in the following table:

| I | 3-isopropyl-2,1,3-benzothiadiazinone-(4)-2,2-dioxide, 0.25, 0.5, 0.75 and 1.0 kg/ha; |
|---|---|
| V | isooctyl 2-(2,4-dichlorophenoxy)-propionate, 0.25, 0.5, 0.75 and 1.0 kg/ha; |
| VII | dimethylamine salt of 2,4-dichlorophenoxyacetic acid, 0.25, 0.5, 0.75 and 1.0 kg/ha; |

| kg/ha | I | | II | | III | | IV | | V | |
|---|---|---|---|---|---|---|---|---|---|---|
|  | 2.0 | 3.0 | 1.0 | 3.0 | 1.5 | 3.0 | 3.0 | 4.0 | 1.5 | 2.0 |
| Zea mays | 0 | 0 | 0 | 0 | 0 | 0 | 0 | 0 | 0 | 0 |
| Hordeum vulgare | 0 | 0 | 0 | 0 | 0 | 0 | 0 | 0 | 0 | 0 |
| Sorghum bicolor | 0 | 0 | 0 | 0 | 0 | 0 | 0 | 10 | 0 | 0 |
| Galium aparine | 55 | 80 | 30 | 75 | 45 | 75 | 75 | 95 | 45 | 60 |
| Stellaria media | 55 | 80 | 35 | 90 | 40 | 75 | 75 | 90 | 65 | 90 |
| Cyperus esculentus | 40 | 65 | 45 | 80 | 40 | 75 | 70 | 90 | 60 | 75 |

| kg/ha | VI | | VII | | VIII | | IX | |
|---|---|---|---|---|---|---|---|---|
|  | 2.0 | 4.0 | 2.0 | 3.0 | 2.0 | 4.0 | 2.0 | 3.0 |
| Zea mays | 0 | 10 | 0 | 0 | 0 | 0 | 0 | 0 |
| Hordeum vulgare | 0 | 10 | 0 | 0 | 0 | 0 | 0 | 0 |
| Sorghum bicolor | 0 | 10 | 0 | 0 | 0 | 0 | 0 | 0 |
| Galium aparine | 45 | 80 | 40 | 70 | 45 | 80 | 40 | 80 |
| Stellaria media | 40 | 75 | 45 | 70 | 40 | 75 | 60 | 85 |
| Cyperus esculentus | 40 | 70 | 50 | 75 | 60 | 90 | 60 | 75 |

| kg/ha | X | | XI | | XII | | XIII | |
|---|---|---|---|---|---|---|---|---|
|  | 2.0 | 4.0 | 1.0 | 3.0 | 2.0 | 4.0 | 1.5 | 3.0 |
| Zea mays | 0 | 0 | 0 | 15 | 0 | 20 | 0 | 15 |
| Hordeum vulgare | 0 | 0 | 0 | 15 | 0 | 20 | 0 | 10 |
| Sorghum bicolor | 0 | 0 | 0 | 20 | 0 | 20 | 0 | 15 |
| Galium aparine | 35 | 60 | 80 | 100 | 85 | 100 | 25 | 40 |
| Stellaria media | 40 | 75 | 55 | 95 | 90 | 100 | 20 | 40 |
| Cyperus esculentus | 50 | 90 | 15 | 25 | 30 | 40 | 20 | 30 |

| kg/ha | XIV | | XV | | XVI | | I + XI | II + XII |
|---|---|---|---|---|---|---|---|---|
|  | 1.0 | 4.0 | 0.5 | 2.0 | 1.0 | 3.0 | 2.0+1.0 | 1.0+2.0 |
| Zea mays | 0 | 20 | 0 | 20 | 0 | 30 | 0 | 0 |
| Hordeum vulgare | 0 | 10 | 0 | 20 | 0 | 30 | 0 | 0 |
| Sorghum bicolor | 0 | 20 | 0 | 20 | 0 | 35 | 0 | 0 |
| Galium aparine | 15 | 45 | 40 | 95 | 75 | 100 | 100 | 100 |
| Stellaria media | 20 | 45 | 30 | 95 | 20 | 60 | 100 | 100 |
| Cyperus esculentus | 15 | 45 | 5 | 10 | 15 | 30 | 80 | 100 |

| kg/ha | III+XIII | IV+XIV | V+XV | VI+XII |
|---|---|---|---|---|
|  | 1.5+1.5 | 3.0+1.0 | 1.5+0.5 | 2.0+2.0 |
| Zea mays | 0 | 0 | 0 | 0 |
| Hordeum vulgare | 0 | 0 | 0 | 0 |
| Sorghum bicolor | 0 | 0 | 0 | 0 |
| Galium aparine | 95 | 100 | 100 | 100 |
| Stellaria media | 95 | 100 | 100 | 100 |
| Cyperus esculentus | 85 | 100 | 85 | 100 |

| kg/ha | VII + XVI | IX + XI |
|---|---|---|
|  | 2.0 + 1.0 | 2.0 + 1.0 |
| Zea mays | 0 | 0 |
| Hordeum vulgare | 0 | 0 |
| Sorghum bicolor | 0 | 0 |
| Galium aparine | 100 | 100 |
| Stellaria media | 95 | 100 |
| Cyperus esculentus | 85 | 95 |

0 = no damage
100 = complete destruction

These results show that the mixtures have an unexpected and far superior herbicidal action to that which would have been expected as a result of mere addition of the herbicidal effects of the individual active ingredients.

EXAMPLE 2

In the greenhouse various plants were treated at a growth height of 2 to 18 cm with the following amounts of the following active ingredients and compositions thereof as dispersions

| IX | dimethylamine salt of 2-(2,4-dichlorophenoxy)-propionic acid, 0.25, 0.5, 0.75 and 1.0 kg/ha; |
|---|---|
| X | sodium salt of 2-(2,4-dichlorophenoxy)propionic acid, 0.25, 0.5, 0.75 and 1.0 kg/ha; |
| XI | dimethylamine salt of 2-methyl-4-chlorophenoxyacetic acid, 0.25, 0.5, 0.75 and 1.0 kg/ha; |
| XII | sodium salt of 2,4-dichlorophenoxyacetic acid, 0.25, 0.5, 0.75 and 1.0 kg/ha; |
| I + V | 0.25 + 0.25, 0.25 + 0.75 and 0.75 + 0.25 kg/ha; |
| I + VII | 0.25 + 0.25, 0.25 + 0.75 and 0.75 + 0.25 kg/ha; |
| I + IX | 0.25 + 0.25, 0.25 + 0.75 and 0.75 + 0.25 kg/ha; |
| I + X | 0.25 + 0.25, 0.25 + 0.75 and 0.75 + 0.25 kg/ha; |
| I + XI | 0.25 + 0.25, 0.25 + 0.75 and 0.75 + 0.25 kg/ha; |
| I + XII | 0.25 + 0.25, 0.25 + 0.75 and 0.75 + 0.25 kg/ha. |

After 2 to 3 weeks it was ascertained that the compositions had a better herbicidal action than their individual components, combined with the same good crop plant compatibility.

The results of this experiment are given below:

EXAMPLE 3

In the greenhouse various plants were treated at a growth height of 2 to 18 cm with the following active ingredients and composition thereof as oil dispersions:

| Active ingredient kg/ha | I | | | | V | | | |
|---|---|---|---|---|---|---|---|---|
| | 0.25 | 0.5 | 0.75 | 1.0 | 0.25 | 0.5 | 0.75 | 1.0 |
| Hordeum vulgare | 0 | 0 | 0 | 0 | 0 | 0 | 0 | 0 |
| Triticum aestivum | 0 | 0 | 0 | 0 | 0 | 0 | 0 | 0 |
| Secale cereale | 0 | 0 | 0 | 0 | 0 | 0 | 0 | 0 |
| Anthemis arvensis | 20 | 30 | 40 | 60 | 5 | 10 | 15 | 20 |
| Chenopodium album | 25 | 30 | 50 | 70 | 15 | 30 | 40 | 65 |
| Chrysanthemum segetum | 20 | 30 | 40 | 70 | 5 | 10 | 15 | 25 |
| Viola spp. | 5 | 10 | 15 | 20 | 20 | 40 | 50 | 65 |

| Active ingredient kg/ha | VII | | | | IX | | | |
|---|---|---|---|---|---|---|---|---|
| | 0.25 | 0.5 | 0.75 | 1.0 | 0.25 | 0.5 | 0.75 | 1.0 |
| Hordeum vulgare | 0 | 0 | 0 | 0 | 0 | 0 | 0 | 0 |
| Triticum aestivum | 0 | 0 | 0 | 0 | 0 | 0 | 0 | 0 |
| Secale cereale | 0 | 0 | 0 | 0 | 0 | 0 | 0 | 0 |
| Anthemis arvensis | 10 | 20 | 30 | 40 | 10 | 20 | 35 | 45 |
| Chenopodium album | 20 | 30 | 40 | 60 | 15 | 25 | 30 | 40 |
| Chrysanthemum segetum | 10 | 20 | 25 | 30 | 10 | 25 | 40 | 55 |
| Viola spp. | 20 | 35 | 45 | 60 | 15 | 25 | 40 | 60 |

| Active ingredient kg/ha | X | | | | XI | | | |
|---|---|---|---|---|---|---|---|---|
| | 0.25 | 0.5 | 0.75 | 1.0 | 0.25 | 0.5 | 0.75 | 1.0 |
| Hordeum vulgare | 0 | 0 | 0 | 0 | 0 | 0 | 0 | 0 |
| Triticum aestivum | 0 | 0 | 0 | 0 | 0 | 0 | 0 | 0 |
| Secale cereale | 0 | 0 | 0 | 0 | 0 | 0 | 0 | 0 |
| Anthemis arvensis | 20 | 35 | 50 | 60 | 10 | 20 | 30 | 40 |
| Chenopodium album | 15 | 35 | 40 | 50 | 20 | 35 | 50 | 70 |
| Chrysanthemum segetum | 15 | 35 | 40 | 50 | 10 | 15 | 20 | 30 |
| Viola spp. | 10 | 20 | 25 | 35 | 20 | 30 | 46 | 65 |

| Active ingredient kg/ha | XII | | | | I + V | | |
|---|---|---|---|---|---|---|---|
| | 0.25 | 0.5 | 0.75 | 1.0 | 0.25+0.25 | 0.75+0.25 | 0.25+0.75 |
| Hordeum vulgare | 0 | 0 | 0 | 0 | 0 | 0 | 0 |
| Triticum aestivum | 0 | 0 | 0 | 0 | 0 | 0 | 0 |
| Secale cereale | 0 | 0 | 0 | 0 | 0 | 0 | 0 |
| Anthemis arvensis | 10 | 15 | 20 | 30 | 65 | 80 | 75 |
| Chenopodium album | 15 | 30 | 40 | 55 | 80 | 95 | 95 |
| Chrysanthemum segetum | 10 | 15 | 20 | 30 | 65 | 80 | 75 |
| Viola spp. | 15 | 20 | 35 | 40 | 67 | 72 | 90 |

| Active ingredient kg/ha | I + VII | | | I + IX | | |
|---|---|---|---|---|---|---|
| | 0.25+0.25 | 0.75+0.25 | 0.25+0.75 | 0.25+0.25 | 0.75+0.25 | 0.25+0.75 |
| Hordeum vulgare | 0 | 0 | 0 | 0 | 0 | 0 |
| Triticum aestivum | 0 | 0 | 0 | 0 | 0 | 0 |
| Secale cereale | 0 | 0 | 0 | 0 | 0 | 0 |
| Anthemis arvensis | 65 | 90 | 85 | 70 | 90 | 90 |
| Chenopodium album | 85 | 100 | 98 | 75 | 90 | 92 |
| Chrysanthemum segetum | 70 | 85 | 80 | 70 | 85 | 95 |
| Viola spp. | 58 | 70 | 85 | 68 | 73 | 85 |

| Active ingredient kg/ha | I + X | | | I + XI | | |
|---|---|---|---|---|---|---|
| | 0.25+0.25 | 0.75+0.25 | 0.25+0.75 | 0.25+0.25 | 0.75+0.25 | 0.25+0.75 |
| Hordeum vulgare | 0 | 0 | 0 | 0 | 0 | 0 |
| Triticum aestivum | 0 | 0 | 0 | 0 | 0 | 0 |
| Secale cereale | 0 | 0 | 0 | 0 | 0 | 0 |
| Anthemis arvensis | 75 | 95 | 100 | 70 | 90 | 85 |
| Chenopodium album | 78 | 98 | 95 | 80 | 100 | 98 |
| Chrysanthemum segetum | 75 | 90 | 97 | 70 | 85 | 90 |
| Viola spp. | 50 | 65 | 75 | 65 | 75 | 85 |

| Active ingredient kg/ha | I + XII | | |
|---|---|---|---|
| | 0.25 + 0.25 | 0.75 + 0.25 | 0.25 + 0.57 |
| Hordeum vulgare | 0 | 0 | 0 |
| Triticum acestivum | 0 | 0 | 0 |
| Secale cereale | 0 | 0 | 0 |
| Anthemis arvensis | 65 | 95 | 80 |
| Chenopodium album | 70 | 85 | 80 |
| Chrysanthemum segetum | 75 | 95 | 95 |
| Viola spp. | 60 | 70 | 74 |

0 = no damage
100 = complete destruction

I  3-isopropyl-2,1,3-benzothiadiazinone-(4)-2,2-dioxide,
0.25, 0.5, 0.75 and 1.0 kg/ha;
VIII  dimethylamine salt of 2-(2-methyl-4-chlorophenoxy)-propionic acid,
0.25, 0.5, 0.75 and 1.0 kg/ha;
I + VIII 0.25 + 0.25, 0.25 + 0.75 and 0.75 + 0.25 kg/ha.

After 2 to 3 weeks it was ascertained that the compsition had a better herbicidal action than its individual components, combined with the same good crop compatibility.

The results of this experiment are given below:

| Active ingredient kg/ha | I | | | | VIII | | | |
|---|---|---|---|---|---|---|---|---|
| | 0.25 | 0.5 | 0.75 | 1.0 | 0.25 | 0.5 | 0.75 | 1.0 |
| Zea mays | 0 | 0 | 0 | 0 | 0 | 0 | 0 | 0 |
| Amaranthus retroflexus | 20 | 30 | 35 | 40 | 10 | 20 | 25 | 30 |
| Portulaca oleracea | 25 | 40 | 50 | 70 | 10 | 15 | 20 | 30 |
| Solanum nigrum | 5 | 10 | 20 | 30 | 10 | 20 | 25 | 35 |
| Cyperus eragrostis | 20 | 35 | 50 | 65 | 5 | 10 | 20 | 25 |
| Cyperus difformis | 18 | 30 | 50 | 75 | 5 | 10 | 25 | 30 |

| Active ingredient kg/ha | I + VIII | | |
|---|---|---|---|
| | 0.25 + 0.25 | 0.75 + 0.25 | 0.25 + 0.75 |
| Zea mays | 0 | 0 | 0 |
| Amaranthus retroflexus | 65 | 75 | 80 |
| Portulaca oleracea | 70 | 90 | 85 |
| Solanum nigrum | 50 | 65 | 70 |
| Cyperus eragrostis | 65 | 90 | 80 |
| Cyperus difformis | 70 | 90 | 80 |

0 = no damage
100 = complete destruction

VII  dimethylamine salt of 2,4-dichlorophenoxyacetic acid,
0.25, 0.75, 1.25 and 1.5 kg/ha;
VIII  dimethylamine salt of 2-(2-methyl-4-chlorophenoxy)-propionic acid,
0.25, 0.75, 1.25 and 1.5 kg/ha;
IX  dimethylamine salt of 2-(2,4-dichlorophenoxy)-propionic acid,
0.25, 0.75, 1.25 and 1.5 kg/ha;
X  sodium salt of 2-(2,4-dichlorophenoxy)-propionic acid,
0.25, 0.75, 1.25 and 1.5 kg/ha;
XI  dimethylamine salt of 2-methyl-4-chlorophenoxyacetic acid,
0.25, 0.75, 1.25 and 1.5 kg/ha;
I + VII  0.25 + 1.25, 1.25 + 0.25 and 0.75 + 0.75 kg/ha;
I + VIII  0.25 + 1.25, 1.25 + 0.25 and 0.75 + 0.75 kg/ha;
I + IX  0.25 + 1.25, 1.25 + 0.25 and 0.75 + 0.75 kg/ha;
I + X  0.25 + 1.25, 1.25 + 0.25 and 0.75 + 0.75 kg/ha;
I + XI  0.25 + 1.25, 1.25 + 0.25 and 0.75 + 0.75 kg/ha;
II + VII  0.25 + 1.25, 1.25 + 0.25 and 0.75 + 0.75 kg/ha;

EXAMPLE 4

In the greenhouse various plants were treated at a growth height of 2 to 18 cm with the following amounts of the following active ingredients and compositions thereof as emulsions:

I  3-isopropyl-2,1,3-benzothiadiazinone-(4)-2,2-dioxide,
0.25, 0.75, 1.25 and 1.5 kg/ha;
II  sodium salt of 3-isopropyl-2,1,3-benzothiadiazinone-(4)-2,2-dioxide
0.25, 0.75, 1.25 and 1.5 kg/ha;
III  dimethylamine salt of 3-isopropyl-2,1,3-benzothiadiazinone-(4)-2,2-dioxide,
0.25, 0.75, 1.25 and 1.5 kg/ha;
IV  diethanolamine salt of 3-isopropyl-2,1,3-benzothiadiazinone-(4)-2,2-dioxide,
0.25, 0.75, 1.25 and 1.5 kg/ha;

II + VIII  0.25 + 1.25, 1.25 + 0.25 and 0.75 + 0.75 kg/ha;
II + IX  0.25 + 1.25, 1.25 + 0.25 and 0.75 + 0.75 kg/ha;
II + X  0.25 + 1.25, 1.25 + 0.25 and 0.75 + 0.75 kg/ha;
II + XI  0.25 + 1.25, 1.25 + 0.25 and 0.75 + 0.75 kg/ha;
III + VII  0.25 + 1.25, 1.25 + 0.25 and 0.75 + 0.75 kg/ha;
III + VIII  0.25 + 1.25, 1.25 + 0.25 and 0.75 + 0.75 kg/ha;
III + IX  0.25 + 1.25, 1.25 + 0.25 and 0.75 + 0.75 kg/ha;
III + X  0.25 + 1.25, 1.25 + 0.25 and 0.75 + 0.75 kg/ha;
III + XI  0.25 + 1.25, 1.25 + 0.25 and 0.75 + 0.75 kg/ha;
IV + VII  0.25 + 1.25, 1.25 + 0.25 and 0.75 + 0.75 kg/ha;
IV + VIII  0.25 + 1.25, 1.25 + 0.25 and 0.75 + 0.75 kg/ha;
IV + IX  0.25 + 1.25, 1.25 + 0.25 and 0.75 + 0.75 kg/ha;
IV + X  0.25 + 1.25, 1.25 + 0.25 and 0.75 + 0.75 kg/ha;
IV + XI  0.25 + 1.25, 1.25 + 0.25 and 0.75 + 0.75 kg/ha.

After 2 to 3 weeks it was ascertained that the compositions had a better herbicidal action than their individual components, combined with the same good crop plant compatibility.

The results of this experiment are given below:

| Active ingredient kg/ha | I | | | | II | | | |
|---|---|---|---|---|---|---|---|---|
| | 0.25 | 0.75 | 1.25 | 1.5 | 0.25 | 0.75 | 1.25 | 1.5 |
| Triticum aestivum | 0 | 0 | 0 | 0 | 0 | 0 | 0 | 0 |
| Hordeum vulgare | 0 | 0 | 0 | 0 | 0 | 0 | 0 | 0 |
| Secale cereale | 0 | 0 | 0 | 0 | 0 | 0 | 0 | 0 |
| Matricaria maritima | 15 | 35 | 50 | 70 | 10 | 35 | 50 | 70 |
| Galium aparine | 20 | 45 | 65 | 80 | 15 | 40 | 65 | 75 |
| Stellaria media | 25 | 40 | 60 | 80 | 10 | 30 | 50 | 70 |
| Lamium amplexicaule | 10 | 30 | 45 | 50 | 5 | 15 | 30 | 40 |

| Active ingredient kg/ha | III | | | | IV | | | |
|---|---|---|---|---|---|---|---|---|
| | 0.25 | 0.75 | 1.25 | 1.5 | 0.25 | 0.75 | 1.25 | 1.5 |
| Triticum aestivum | 0 | 0 | 0 | 0 | 0 | 0 | 0 | 0 |
| Hordeum vulgare | 0 | 0 | 0 | 0 | 0 | 0 | 0 | 0 |
| Secale cereale | 0 | 0 | 0 | 0 | 0 | 0 | 0 | 0 |
| Matricaria maritima | 15 | 45 | 65 | 75 | 15 | 50 | 75 | 95 |
| Galium aparine | 20 | 40 | 55 | 60 | 25 | 45 | 70 | 80 |
| Stellaria media | 10 | 35 | 50 | 70 | 10 | 40 | 70 | 85 |
| Lamium amplexicaule | 5 | 20 | 35 | 45 | 6 | 25 | 40 | 50 |

| Active ingredient kg/ha | VII | | | | VIII | | | |
|---|---|---|---|---|---|---|---|---|
| | 0.25 | 0.75 | 1.25 | 1.5 | 0.25 | 0.75 | 1.25 | 1.5 |
| Triticum aestivum | 0 | 0 | 0 | 0 | 0 | 0 | 0 | 0 |
| Hordeum vulgare | 0 | 0 | 0 | 0 | 0 | 0 | 0 | 0 |
| Secale cereale | 0 | 0 | 0 | 0 | 0 | 0 | 0 | 0 |

| Active ingredient kg/ha | VII 0.25 | 0.75 | 1.25 | 1.5 | VIII 0.25 | 0.75 | 1.25 | 1.5 |
|---|---|---|---|---|---|---|---|---|
| Matricaria maritima | 10 | 30 | 50 | 70 | 10 | 20 | 30 | 35 |
| Galium aparine | 5 | 15 | 21 | 25 | 15 | 40 | 60 | 70 |
| Stellaria media | 3 | 8 | 15 | 20 | 20 | 40 | 55 | 70 |
| Lamium amplexicaule | 20 | 55 | 80 | 80 | 10 | 20 | 30 | 50 |

| Active ingredient kg/ha | IX 0.25 | 0.75 | 1.25 | 1.5 | X 0.25 | 0.75 | 1.25 | 1.5 |
|---|---|---|---|---|---|---|---|---|
| Triticum aestivum | 0 | 0 | 0 | 0 | 0 | 0 | 0 | 0 |
| Hordeum vulgare | 0 | 0 | 0 | 0 | 0 | 0 | 0 | 0 |
| Secale cereale | 0 | 0 | 0 | 0 | 0 | 0 | 0 | 0 |
| Matricaria maritima | 15 | 25 | 45 | 50 | 3 | 10 | 25 | 35 |
| Galium aparine | 10 | 30 | 70 | 75 | 15 | 40 | 60 | |
| Stellaria media | 15 | 40 | 60 | 75 | 15 | 40 | 55 | 70 |
| Lamium amplexicaule | 15 | 35 | 65 | 90 | 10 | 20 | 60 | 75 |

| Active ingredient kg/ha | IX 0.25 | 0.75 | 1.25 | 1.5 |
|---|---|---|---|---|
| Triticum aestivum | 0 | 0 | 0 | 0 |
| Hordeum vulgare | 0 | 0 | 0 | 0 |
| Secale cereale | 0 | 0 | 0 | 0 |
| Matricaria maritima | 5 | 15 | 30 | 40 |
| Galium aparine | 5 | 15 | 22 | 25 |
| Stellaria media | 10 | 18 | 25 | 35 |
| Lamium amplexicaule | 20 | 60 | 85 | 90 |

| Active ingredient kg/ha | I + VII 0.25+1.25 | 1.25+0.25 | 0.75+0.75 | I + VII 0.25+1.25 | 1.25+0.25 | 0.75+0.75 |
|---|---|---|---|---|---|---|
| Triticum aestivum | 0 | 0 | 0 | 0 | 0 | 0 |
| Hordeum vulgare | 0 | 0 | 0 | 0 | 0 | 0 |
| Secale cereale | 0 | 0 | 0 | 0 | 0 | 0 |
| Matricaria maritima | 85 | 90 | 95 | 80 | 87 | 90 |
| Galium aparine | 80 | 98 | 100 | 100 | 100 | 100 |
| Stellaria media | 86 | 90 | 90 | 100 | 100 | 100 |
| Lamium amplexicaule | 100 | 95 | 100 | 78 | 95 | 90 |

| Active ingredient kg/ha | I + IX 0.25+1.25 | 1.25+0.25 | 0.75+0.75 | I + X 0.25+1.25 | 1.25+0.25 | 0.75+0.75 |
|---|---|---|---|---|---|---|
| Triticum aestivum | 0 | 0 | 0 | 0 | 0 | 0 |
| Hordeum vulgare | 0 | 0 | 0 | 0 | 0 | 0 |
| Secale cereale | 0 | 0 | 0 | 0 | 0 | 0 |
| Matricaria maritima | 95 | 97 | 92 | 80 | 87 | 82 |
| Galium aparine | 100 | 100 | 100 | 100 | 100 | 100 |
| Stellaria media | 100 | 100 | 100 | 100 | 100 | 100 |
| Lamium amplexicaule | 100 | 95 | 98 | 100 | 90 | 86 |

| Active ingredient kg/ha | I + XI 0.25+1.25 | 1.25+0.25 | 0.75+0.75 | II + VII 0.25+1.25 | 1.25+0.25 | 0.75+0.75 |
|---|---|---|---|---|---|---|
| Triticum aestivum | 0 | 0 | 0 | 0 | 0 | 0 |
| Hordeum vulgare | 0 | 0 | 0 | 0 | 0 | 0 |
| Secale cereale | 0 | 0 | 0 | 0 | 0 | 0 |
| Matricaria maritima | 80 | 90 | 83 | 95 | 93 | 95 |
| Galium aparine | 86 | 97 | 95 | 75 | 100 | 90 |
| Stellaria media | 85 | 100 | 92 | 70 | 87 | 75 |
| Lamium amplexicaule | 100 | 94 | 100 | 100 | 85 | 100 |

| Active ingredient kg/ha | II + VIII 0.25+1.25 | 1.25+0.25 | 0.75+0.75 | II + IX 0.25+1.25 | 1.25+0.25 | 0.75+0.75 |
|---|---|---|---|---|---|---|
| Triticum aestivum | 0 | 0 | 0 | 0 | 0 | 0 |
| Hordeum vulgare | 0 | 0 | 0 | 0 | 0 | 0 |
| Secale cereale | 0 | 0 | 0 | 0 | 0 | 0 |
| Matricaria maritima | 77 | 87 | 90 | 90 | 96 | 93 |
| Galium aparine | 100 | 100 | 100 | 100 | 100 | 100 |
| Stellaria media | 97 | 100 | 100 | 100 | 100 | 100 |
| Lamium amplexicaule | 70 | 80 | 73 | 98 | 97 | 94 |

| Active ingredient kg/ha | II + X 0.25+1.25 | 1.25+0.25 | 0.75+0.75 | II + XI 0.25+1.25 | 1.25+0.25 | 0.75+0.75 |
|---|---|---|---|---|---|---|
| Triticum aestivum | 0 | 0 | 0 | 0 | 0 | 0 |
| Hordeum vulgare | 0 | 0 | 0 | 0 | 0 | 0 |
| Secale cereale | 0 | 0 | 0 | 0 | 0 | 0 |
| Matricaria maritima | 77 | 90 | 80 | 70 | 90 | 85 |
| Galium aparine | 100 | 100 | 100 | 75 | 100 | 90 |
| Stellaria media | 95 | 97 | 100 | 77 | 86 | 90 |
| Lamium amplexicaule | 90 | 80 | 76 | 100 | 90 | 100 |

| Active ingredient kg/ha | III + VII 0.25+ 1.25 | 1.25+ 0.25 | 0.75+ 0.75 | III + VIII 0.25+ 1.25 | 1.25+ 0.25 | 0.75+ 0.75 |
|---|---|---|---|---|---|---|
| Triticum aestivum | 0 | 0 | 0 | 0 | 0 | 0 |
| Hordeum vulgare | 0 | 0 | 0 | 0 | 0 | 0 |
| Secale cereale | 0 | 0 | 0 | 0 | 0 | 0 |
| Matricaria maritima | 90 | 100 | 100 | 100 | 100 | 97 |
| Galium aparine | 80 | 87 | 90 | 100 | 100 | 100 |
| Stellaria media | 68 | 80 | 78 | 100 | 100 | 100 |
| Lamium amplexicaule | 100 | 90 | 100 | 90 | 80 | 80 |

| Active ingredient kg/ha | III + IX 0.25+ 1.25 | 1.25+ 0.25 | 0.75+ 0.75 | III + X 0.25+ 1.25 | 1.25+ 0.25 | 0.75+ 0.75 |
|---|---|---|---|---|---|---|
| Triticum aestivum | 0 | 0 | 0 | 0 | 0 | 0 |
| Hordeum vulgare | 0 | 0 | 0 | 0 | 0 | 0 |
| Secale cereale | 0 | 0 | 0 | 0 | 0 | 0 |
| Matricaria maritima | 95 | 100 | 100 | 83 | 100 | 95 |
| Galium aparine | 100 | 98 | 100 | 100 | 100 | 100 |
| Stellaria media | 100 | 95 | 100 | 98 | 100 | 100 |
| Lamium amplexicaule | 100 | 95 | 95 | 93 | 83 | 80 |

| Active ingredient kg/ha | III + XI 0.25+ 1.25 | 1.25+ 0.25 | 0.75+ 0.75 | IV + VII 0.25+ 1.25 | 1.25+ 0.25 | 0.75+ 0.75 |
|---|---|---|---|---|---|---|
| Triticum aestivum | 0 | 0 | 0 | 0 | 0 | 0 |
| Hordeum vulgare | 0 | 0 | 0 | 0 | 0 | 0 |
| Secale cereale | 0 | 0 | 0 | 0 | 0 | 0 |
| Matricaria maritima | 80 | 100 | 97 | 100 | 100 | 100 |
| Galium aparine | 75 | 95 | 90 | 85 | 100 | 95 |
| Stellaria media | 75 | 97 | 90 | 70 | 100 | 90 |
| Lamium amplexicaule | 100 | 95 | 100 | 100 | 100 | 100 |

| Active ingredient kg/ha | IV + VIII 0.25+ 1.25 | 1.25+ 0.25 | 0.75+ 0.75 | IV + IX 0.25+ 1.25 | 1.25+ 0.25 | 0.75+ 0.75 |
|---|---|---|---|---|---|---|
| Triticum aestivum | 0 | 0 | 0 | 0 | 0 | 0 |
| Hordeum vulgare | 0 | 0 | 0 | 0 | 0 | 0 |
| Secale cereale | 0 | 0 | 0 | 0 | 0 | 0 |
| Matricaria maritima | 85 | 100 | 100 | 100 | 100 | 100 |
| Galium aparine | 100 | 100 | 100 | 100 | 100 | 100 |
| Stellaria media | 100 | 100 | 100 | 100 | 100 | 100 |
| Lamium amplexicaule | 75 | 85 | 80 | 100 | 95 | 100 |

| Active ingredient kg/ha | IV + X 0.25+ 1.25 | 1.25+ 0.25 | 0.75+ 0.75 | IV + XI 0.25+ 1.25 | 1.25+ 0.25 | 0.75+ 0.75 |
|---|---|---|---|---|---|---|
| Triticum aestivum | 0 | 0 | 0 | 0 | 0 | 0 |
| Hordeum vulgare | 0 | 0 | 0 | 0 | 0 | 0 |
| Secale cereale | 0 | 0 | 0 | 0 | 0 | 0 |
| Matricaria maritima | 90 | 100 | 95 | 90 | 100 | 98 |
| Galium aparine | 100 | 100 | 100 | 90 | 100 | 95 |
| Stellaria media | 100 | 100 | 100 | 85 | 100 | 97 |
| Lamium amplexicaule | 90 | 90 | 80 | 100 | 98 | 100 |

0 = no damage
100 = complete destruction

EXAMPLE 5

In the open various plants were treated at a growth height of 2 to 18 cm with the following amounts of the following active ingredients and compositions thereof as oil dispersions:

I   3-isopropyl-2,1,3-benzothiadiazinone-(4)-2,2-dioxide, 1.0, 3.0, 5.0 and 6.0 kg/ha;
II  sodium salt of 3-isopropyl-2,1,3-benzothiadiazinone-(4)-2,2-dioxide, 1.0, 3.0, 5.0 and 6.0 kg/ha;
III dimethylamine salt of 3-isopropyl-2,1,3-benzothiadiazinone-(4)-2,2-dioxide, 1.0, 3.0, 5.0 and 6.0 kg/ha;
IV  diethanolamine salt of 3-isopropyl-2,1,3-benzothiadiazinone-(4)-2,2-dioxide, 1.0, 3.0, 5.0 and 6.0 kg/ha;
VII dimethylamine salt of 2,4-dichlorophenoxyacetic acid, 1.0, 3.0, 5.0 and 6.0 kg/ha;
VIII dimethylamine salt of 2-(2-methyl-4-chlorophenoxy)-propionic acid, 1.0, 3.0, 5.0 and 6.0 kg/ha;
IX  dimethylamine salt of 2-(2,4-dichlorophenoxy)-propionic acid, 1.0, 3.0, 5.0 and 6.0 kg/ha;
X   sodium salt of 2-(2,4-dichlorophenoxy)-propionic acid, 1.0, 3.0, 5.0 and 6.0 kg/ha;
XI  dimethylamine salt of 2-methyl-4-chlorophenoxyacetic acid, 1.0, 3.0, 5.0 and 6.0 kg/ha;
XV  N-3,4-dichlorophenyl-N',N'-dimethylurea, 5.0 and 6.0 kg/ha;

| | | |
|---|---|---|
| I | +VII | 1.0 + 5.0, 5.0 + 1.0 and 3.0 + 3.0 kg/ha; |
| I | + VII | 1.0 + 5.0, 5.0 + 1.0 and 3.0 + 3.0 kg/ha; |
| I | + IX | 1.0 + 5.0, 5.0 + 1.0 and 3.0 + 3.0 kg/ha; |
| I | + X | 1.0 + 5.0, 5.0 + 1.0 and 3.0 + 3.0 kg/ha; |
| I | + XI | 1.0 + 5.0, 5.0 + 1.0 and 3.0 + 3.0 hg/ha; |
| II | + VII | 1.0 + 5.0, 5.0 + 1.0, 3.0 + 3.0 kg/ha; |
| II | +VIII | 1.0 + 5.0, 5.0 + 1.0, 3.0 + 3.0 kg/ha; |
| II | + IX | 1.0 + 5.0, 5.0 + 1.0, 3.0 + 3.0 kg/ha; |
| II | + X | 1.0 + 5.0, 5.0 + 1.0, 3.0 + 3.0 kg/ha; |
| II | + XI | 1.0 + 5.0, 5.0 + 1.0, 3.0 + 3.0 kg/ha; |
| III | + VII | 1.0 + 5.0, 5.0 + 1.0, 3.0 + 3.0 kg/ha; |
| III | + VIII | 1.0 + 5.0, 5.0 + 1.0, 3.0 + 3.0 kg/ha; |
| III | + IX | 1.0 + 5.0, 5.0 + 1.0, 3.0 + 3.0 kg/ha; |
| III | + X | 1.0 + 5.0, 5.0 + 1.0, 3.0 + 3.0 kg/ha; |
| III | + XI | 1.0 + 5.0, 5.0 + 1.0, 3.0 + 3.0 kg/ha; |
| IV | + VII | 1.0 + 5.0, 5.0 + 1.0, 3.0 + 3.0 kg/ha; |
| IV | + VIII | 1.0 + 5.0, 5.0 + 1.0, 3.0 + 3.0 kg/ha; |
| IV | + IX | 1.0 + 5.0, 5.0 + 1.0, 3.0 + 3.0 kg/ha; |
| IV | + X | 1.0 + 5.0, 5.0 + 1.0, 3.0 + 3.0 kg/ha; |
| IV | + XI | 1.0 + 5.0, 5.0 + 1.0, 3.0 + 3.0 kg/ha; |
| XV | + I | 5.0 + 1.0 kg/ha. |

After 2 to 3 weeks it was ascertained that the compositions I + VII, I + VII, I + IX, I + X, I + XI, II + VII, II + VIII, II + IX, II + X, II + XI, III + VII, III + VIII, III + IX, III + X, III + XI, IV + VII, IV + VIII, IV + IX, IV + X and IV + XI had a better herbicidal action than active ingredient XV and composition XV + I, combined with superior crop plant compatibility.

The results of this experiment are given below:

| Active ingredient kg/ha | I | | | | II | | | |
|---|---|---|---|---|---|---|---|---|
| | 1.0 | 3.0 | 5.0 | 6.0 | 1.0 | 3.0 | 5.0 | 6.0 |
| Triticum aestivum | 0 | 0 | 5 | 10 | 0 | 0 | 5 | 8 |
| Hordeum vulgare | 0 | 0 | 5 | 10 | 0 | 0 | 5 | 10 |
| Secale cereale | 0 | 0 | 5 | 10 | 0 | 0 | 5 | 10 |
| Matricaria maritima | 40 | 100 | 100 | 100 | 55 | 100 | 100 | 100 |
| Galium aparine | 65 | 95 | 100 | 100 | 60 | 95 | 100 | 100 |
| Stellaria media | 60 | 95 | 100 | 100 | 45 | 94 | 100 | 100 |
| Lamium amplexicaule | 40 | 70 | 90 | 95 | 25 | 60 | 80 | 90 |

| Active ingredient kg/ha | III | | | | IV | | | |
|---|---|---|---|---|---|---|---|---|
| | 1.0 | 3.0 | 5.0 | 6.0 | 1.0 | 3.0 | 5.0 | 6.0 |
| Triticum aestivum | 0 | 0 | 4 | 9 | 0 | 0 | 7 | 15 |
| Hordeum vulgare | 0 | 0 | 5 | 10 | 0 | 0 | 10 | 15 |
| Secale cereale | 0 | 0 | 5 | 10 | 0 | 0 | 10 | 18 |
| Matricaria maritama | 65 | 100 | 100 | 100 | 70 | 100 | 100 | 100 |
| Galium aparine | 50 | 100 | 100 | 100 | 65 | 90 | 100 | 100 |
| Stellaria media | 50 | 95 | 100 | 100 | 60 | 100 | 100 | 100 |
| Lamium amplexicaule | 40 | 60 | 80 | 95 | 35 | 75 | 90 | 100 |

| Active ingredient kg/ha | VII | | | | VII | | | |
|---|---|---|---|---|---|---|---|---|
| | 1.0 | 3.0 | 5.0 | 6.0 | 1.0 | 3.0 | 5.0 | 6.0 |
| Triticum aestivum | 0 | 5 | 30 | 35 | 0 | 5 | 25 | 30 |
| Hordeum vulgare | 0 | 10 | 35 | 40 | 0 | 15 | 30 | 35 |
| Secale cereale | 0 | 5 | 30 | 40 | 0 | 10 | 35 | 40 |
| Matricaria maritima | 40 | 95 | 100 | 100 | 25 | 60 | 95 | 100 |
| Galium aparine | 20 | 30 | 50 | 70 | 50 | 100 | 100 | 100 |
| Stellaria media | 10 | 35 | 50 | 75 | 45 | 100 | 100 | 100 |
| Lamium amplexicaule | 80 | 100 | 100 | 100 | 25 | 70 | 100 | 100 |

| Active ingredient kg/ha | IX | | | | X | | | |
|---|---|---|---|---|---|---|---|---|
| | 1.0 | 3.0 | 5.0 | 6.0 | 1.0 | 3.0 | 5.0 | 6.0 |
| Triticum aestivum | 0 | 15 | 25 | 30 | 0 | 10 | 20 | 30 |
| Hordeum vulgare | 0 | 15 | 25 | 35 | 0 | 10 | 25 | 30 |
| Secale cereale | 0 | 25 | 30 | 40 | 0 | 10 | 25 | 35 |
| Matricaria maritima | 40 | 90 | 100 | 100 | 20 | 60 | 95 | 100 |
| Galium aparine | 65 | 100 | 100 | 100 | 50 | 100 | 100 | 100 |
| Stellaria media | 55 | 95 | 100 | 100 | 45 | 100 | 100 | 100 |
| Lamium amplexicaule | 60 | 90 | 100 | 100 | 45 | 80 | 100 | 100 |

| Active ingredient kg/ha | XI | | | | XV | |
|---|---|---|---|---|---|---|
| | 1.0 | 3.0 | 5.0 | 6.0 | 5.0 | 6.0 |
| Triticum aestivum | 0 | 10 | 30 | 35 | 95 | 100 |
| Hordeum vulgare | 0 | 10 | 10 | 15 | 100 | 100 |
| Secale cereale | 0 | 10 | 35 | 40 | 100 | 100 |
| Matricaria maritima | 25 | 60 | 80 | 95 | 100 | 100 |
| Galium aparine | 20 | 30 | 50 | 70 | 100 | 100 |
| Stellaria media | 20 | 35 | 50 | 70 | 100 | 100 |
| Lamium amplexicaule | 80 | 100 | 100 | 100 | 100 | 100 |

| Active ingredient kg/ha | I+VII | | | I+VIII | | |
|---|---|---|---|---|---|---|
| | 1.0+5.0 | 5.0+1.0 | 3.0+3.0 | 1.0+5.0 | 5.0+1.0 | 3.0+3.0 |
| Triticum aestivum | 30 | 5 | 5 | 25 | 5 | 5 |
| Hordeum vulgare | 35 | 5 | 10 | 30 | 5 | 15 |
| Secale cereale | 30 | 5 | 5 | 35 | 5 | 10 |
| Matricaria maritima | 100 | 100 | 100 | 100 | 100 | 100 |
| Galium aparine | 100 | 100 | 100 | 100 | 100 | 100 |
| Stellaria media | 100 | 100 | 100 | 100 | 100 | 100 |
| Lamium amplexicaule | 100 | 100 | 100 | 100 | 100 | 100 |

| Active ingredient kg/ha | I+IX | | | I+X | | |
|---|---|---|---|---|---|---|
| | 1.0+5.0 | 5.0+1.0 | 3.0+3.0 | 1.0+5.0 | 5.0+1.0 | 3.0+3.0 |
| Triticum aestivum | 25 | 5 | 15 | 20 | 5 | 10 |
| Hordeum vulgare | 25 | 5 | 15 | 25 | 5 | 10 |
| Secale cereale | 30 | 5 | 25 | 25 | 5 | 10 |
| Matricaria maritima | 100 | 100 | 100 | 100 | 100 | 100 |
| Galium aparine | 100 | 100 | 100 | 100 | 100 | 100 |
| Stellaria media | 100 | 100 | 100 | 100 | 100 | 100 |
| Lamium amplexicaule | 100 | 100 | 100 | 100 | 100 | 100 |

| Active ingredient kg/ha | I+XI | | | II+VII | | |
|---|---|---|---|---|---|---|
| | 1.0+5.0 | 5.0+1.0 | 3.0+3.0 | 1.0+5.0 | 5.0+1.0 | 3.0+3.0 |
| Triticum aestivum | 30 | 5 | 10 | 30 | 5 | 5 |
| Hordeum vulgare | 10 | 5 | 10 | 35 | 5 | 10 |
| Secale cereale | 15 | 5 | 10 | 30 | 5 | 5 |
| Matricaria maritima | 100 | 100 | 100 | 100 | 100 | 100 |
| Galium aparine | 100 | 100 | 100 | 100 | 100 | 100 |
| Stellaria media | 100 | 100 | 100 | 100 | 100 | 100 |
| Lamium amplexicaule | 100 | 100 | 100 | 100 | 100 | 100 |

| Active ingredient kg/ha | II+ VIII | | | II+ IX | | |
|---|---|---|---|---|---|---|
| | 1.0+5.0 | 5.0+1.0 | 3.0+3.0 | 1.0+5.0 | 5.0+1.0 | 3.0+3.0 |
| Triticum aestivum | 25 | 5 | 5 | 25 | 5 | 15 |
| Hordeum vulgare | 30 | 5 | 15 | 25 | 5 | 15 |
| Secale cereale | 35 | 5 | 10 | 30 | 5 | 25 |
| Matricaria maritima | 100 | 100 | 100 | 100 | 100 | 100 |
| Galium aparine | 100 | 100 | 100 | 100 | 100 | 100 |
| Stellaria media | 100 | 100 | 100 | 100 | 100 | 100 |
| Lamium amplexicaule | 100 | 100 | 100 | 100 | 100 | 100 |

| Active ingredient kg/ha | II+ X | | | II+ XI | | |
|---|---|---|---|---|---|---|
| | 1.0+5.0 | 5.0+1.0 | 3.0+3.0 | 1.0+5.0 | 5.0+1.0 | 3.0+3.0 |
| Triticum aestivum | 20 | 5 | 10 | 30 | 5 | 10 |
| Hordeum vulgare | 25 | 5 | 10 | 10 | 5 | 10 |
| Secale cereale | 25 | 5 | 10 | 35 | 5 | 10 |
| Matricaria maritima | 100 | 100 | 100 | 100 | 100 | 100 |
| Galium aparine | 100 | 100 | 100 | 100 | 100 | 100 |
| Stellaria media | 100 | 100 | 100 | 100 | 100 | 100 |
| Lamium amplexicaule | 100 | 100 | 100 | 100 | 100 | 100 |

| Active ingredient kg/ha | III+ VII | | | III+ VIII | | |
|---|---|---|---|---|---|---|
| | 1.0+5.0 | 5.0+1.0 | 3.0+3.0 | 1.0+5.0 | 5.0+1.0 | 3.0+3.0 |
| Triticum aestivum | 30 | 5 | 5 | 25 | 5 | 5 |
| Hordeum vulgare | 35 | 5 | 10 | 30 | 5 | 15 |
| Secale cereale | 30 | 5 | 5 | 35 | 5 | 10 |
| Matricaria maritima | 100 | 100 | 100 | 100 | 100 | 100 |
| Galium aparine | 100 | 100 | 100 | 100 | 100 | 100 |
| Stellaria media | 100 | 100 | 100 | 100 | 100 | 100 |
| Lamium amplexicaule | 100 | 100 | 100 | 100 | 100 | 100 |

| Active ingredient kg/ha | III+ IX | | | III+ X | | |
|---|---|---|---|---|---|---|
| | 1.0+5.0 | 5.0+1.0 | 3.0+3.0 | 1.0+5.0 | 5.0+1.0 | 3.0+3.0 |
| Triticum aestivum | 25 | 5 | 15 | 20 | 5 | 10 |
| Hordeum vulgare | 25 | 5 | 25 | 25 | 5 | 10 |
| Secale cereale | 30 | 5 | 25 | 25 | 5 | 10 |
| Matricaira maritima | 100 | 100 | 100 | 100 | 100 | 100 |
| Galium aparine | 100 | 100 | 100 | 100 | 100 | 100 |
| Stellaria media | 100 | 100 | 100 | 100 | 100 | 100 |
| Lamium amplexicaule | 100 | 100 | 100 | 100 | 100 | 100 |

| Active ingredient kg/ha | III+ XI | | | IV+ VII | | |
|---|---|---|---|---|---|---|
| | 1.0+5.0 | 5.0+1.0 | 3.0+3.0 | 1.0+5.0 | 5.0+1.0 | 3.0+3.0 |
| Triticum aestivum | 30 | 5 | 10 | 30 | 10 | 5 |
| Hordeum vulgare | 10 | 5 | 10 | 35 | 10 | 10 |
| Secale cereale | 35 | 5 | 12 | 30 | 10 | 5 |
| Matricaria maritima | 100 | 100 | 100 | 100 | 100 | 100 |
| Galium aparine | 100 | 100 | 100 | 100 | 100 | 100 |
| Stellaria media | 100 | 100 | 100 | 100 | 100 | 100 |
| Lamium amplexicaule | 100 | 100 | 100 | 100 | 100 | 100 |

| Active ingredient kg/ha | IV+ VIII | | | IV+ IX | | |
|---|---|---|---|---|---|---|
| | 1.0+5.0 | 5.0+1.0 | 3.0+3.0 | 1.0+5.0 | 5.0+1.0 | 3.0+3.0 |
| Triticum aestivum | 25 | 8 | 5 | 25 | 10 | 15 |
| Hordeum vulgare | 30 | 10 | 15 | 25 | 10 | 15 |
| Secale cereale | 35 | 10 | 10 | 30 | 10 | 25 |
| Marticaria maritima | 100 | 100 | 100 | 100 | 100 | 100 |
| Galiuim aparine | 100 | 100 | 100 | 100 | 100 | 100 |
| Stellaria media | 100 | 100 | 100 | 100 | 100 | 100 |
| Lamium amplexicaule | 100 | 100 | 100 | 100 | 100 | 100 |

| Active ingredient kg/ha | IV+ X | | | IV+ XI | | |
|---|---|---|---|---|---|---|
| | 1.0+5.0 | 5.0+1.0 | 3.0+3.0 | 1.0+5.0 | 5.0+1.0 | 3.0+3.0 |
| Triticum aestivum | 20 | 10 | 10 | 30 | 10 | 10 |
| Hordeum vulgare | 25 | 10 | 10 | 10 | 10 | 10 |
| Secale cereale | 25 | 10 | 10 | 35 | 10 | 10 |
| Matricaria maritima | 100 | 100 | 100 | 100 | 100 | 100 |
| Galium aparine | 100 | 100 | 100 | 100 | 100 | 100 |
| Stellaria media | 100 | 100 | 100 | 100 | 100 | 100 |
| Lamium amplexicaule | 100 | 100 | 100 | 100 | 100 | 100 |

| Active ingredient kg/ha | XV+I 5.0+1.0 |
|---|---|
| Triticum aestivum | 100 |
| Hordeum vulgare | 100 |
| Secale cereale | 100 |
| Matricaria maritima | 100 |
| Galium aparine | 100 |
| Stellaria media | 100 |
| Lamium amplexicaule | 100 |

0=no damage
100=complete destruction

EXAMPLE 6

In the greenhouse various plants were treated at a growth height of 3 to 25 cm with the following amounts of the following active ingredients and compositions thereof as dispersions or emulsions.

| | | |
|---|---|---|
| I | | 3-isopropyl-2,1,3-benzothiadiazinone-(4)-2,2-dioxide, 0.25, 0.75, 1.0, 1.25, 1.5, 3.0, 5.0 and 6.0 kg/ha; |
| II | | sodium salt of 3-isopropyl-2,1,3-benzothiadiazinone-(4)-2,2-dioxide, 0.25, 0.75, 1.0, 1.25, 1.5, 3.0, 5.0 and 6.0 kg/ha; |
| III | | dimethylamine salt of 3-isopropyl-2,1,3-benzothiadiazinone-(4)-2,2-dioxide, 0.25, 0.75, 1.0, 1.25, 1.5, 3.0, 5.0 and 6.0 kg/ha; |
| IV | | diethanolamine salt of 3-isopropyl-2,1,3-benzothiadiazinone-(4)-2,2-dioxide, 0.25, 0.75, 1.0, 1.25, 1.5, 3.0, 5.0 and 6.0 kg/ha; |
| XIII | | potassium salt of 2,4,5-trichloropheneoxypropionic acid, 0.25, 0.75, 1.0, 1.25, 1.5, 3.0, 5.0 and 6.0 kg/ha; |
| XV | | N-3,4-dichlorophenyl-N',N'-dimethylurea 5.0 and 6.0 kg/ha; |
| I | +XIII | 0.25+1.25, 1.25+0.25, 0.75+0.75, 1.0+5.0, 5.0+1.0 and 3.0+3.0 kg/ha; |
| II | +XIII | 0.25+1.25, 1.25+0.25, 0.75+0.75, 1.0+5.0, 5.0+1.0 and 3.0+3.0 kg/ha; |
| III | +XIII | 0.25+1.25, 1.25+0.25, 0.75+0.75, 1.0+5.0, 5.0+1.0 and 3.0+3.0 kg/ha; |
| IV | +XIII | 0.25+1.25, 1.25+0.25, 0.75+0.75, 1.0+5.0, 5.0+1.0 and 3.0+3.0 kg/ha; |
| XV | +I | 5.0+1.0 kg/ha. |

After 2 to 3 weeks it was ascertained that the compositions I+XIII, II+XIII, III+XIII and IV+XIII at the application rates 0.25+1.25, 1.25+0.25 and 0.75+0.75 kg/ha had a better herbicidal action that active ingredients I to IV and XII combined with the same good crop plant compatibility. Compositions I+XIII, II+XIII, III+XIII and IV+XIII at the application rates 1.0+5.0, 5.0+1.0 and 3.0+3.0 kg/ha had better crop plant compatibility than XV and the composition XV+I. The results are given below:

| Active ingredient kg/ha | 0.25 | 0.75 | 1.0 | 1.25 I | 1.5 | 3.0 | 5.0 | 6.0 | | |
|---|---|---|---|---|---|---|---|---|---|---|
| Oryza sativa | 0 | 0 | 0 | 0 | 0 | 0 | 5 | 10 | | |
| Alisma plantago | 35 | 50 | 55 | 65 | 75 | 80 | 100 | 100 | | |
| Bidens pilosa | 15 | 35 | 50 | 60 | 80 | 100 | 100 | 100 | | |
| Cyperus esculentus | 40 | 65 | 65 | 73 | 80 | 90 | 100 | 100 | | |
| Cyperus rotundus | 40 | 60 | 65 | 70 | 80 | 100 | 100 | 100 | | |
| Active ingredient kg/ha | 0.25 | 0.75 | 1.0 | 1.25 II | 1.5 | 3.0 | 5.0 | 6.0 | | |
| Oryza sativa | 0 | 0 | 0 | 0 | 0 | 0 | 5 | 10 | | |
| Alisma plantago | 30 | 40 | 50 | 60 | 70 | 80 | 100 | 100 | | |
| Bidens pilosa | 15 | 35 | 45 | 55 | 75 | 100 | 100 | 100 | | |
| Cyperus esculentus | 15 | 30 | 45 | 50 | 70 | 90 | 100 | 100 | | |
| Cyperus rotundus | 10 | 30 | 40 | 53 | 70 | 90 | 100 | 100 | | |
| Active ingredient kg/ha | 0.25 | 0.75 | 1.0 | 1.25 III | 1.5 | 3.0 | 5.0 | 6.0 | | |
| Oryza sativa | 0 | 0 | 0 | 0 | 0 | 0 | 4 | 10 | | |
| Alisma plantago | 28 | 40 | 53 | 65 | 72 | 80 | 100 | 100 | | |
| Bidens pilosa | 10 | 35 | 40 | 50 | 78 | 100 | 100 | 100 | | |
| Cyperus esculentus | 14 | 30 | 48 | 55 | 67 | 95 | 100 | 100 | | |
| Cyperus rotundus | 10 | 25 | 50 | 57 | 80 | 95 | 100 | 100 | | |
| Active ingredient kg/ha | 0.25 | 0.75 | 1.0 | 1.25 IV | 1.5 | 3.0 | 5.0 | 6.0 | | |
| Oryza sativa | 0 | 0 | 0 | 0 | 0 | 0 | 7 | 15 | | |
| Alisma plantago | 30 | 50 | 55 | 60 | 70 | 80 | 100 | 100 | | |
| Bidens pilosa | 20 | 40 | 50 | 65 | 80 | 100 | 100 | 100 | | |
| Cyperus esculentus | 15 | 35 | 50 | 55 | 70 | 90 | 100 | 100 | | |
| Cyperus rotundus | 10 | 30 | 40 | 55 | 75 | 98 | 100 | 100 | | |
| Active ingredient kg/ha | 0.25 | 0.75 | 1.0 | 1.25 XIII | 1.5 | 3.0 | 5.0 | 6.0 | 5.0 XV | 6.0 |
| Oryza sativa | 0 | 0 | 0 | 0 | 0 | 10 | 30 | 45 | 100 | 100 |
| Alisma plantago | 15 | 40 | 50 | 60 | 70 | 75 | 95 | 100 | 100 | 100 |
| Bidens pilosa | 10 | 25 | 30 | 50 | 70 | 80 | 95 | 100 | 100 | 100 |
| Cyperus esculentus | 2 | 8 | 10 | 10 | 15 | 18 | 25 | 30 | 100 | 100 |
| Cyperus rotundus | 0 | 2 | 5 | 7 | 10 | 12 | 15 | 20 | 100 | 100 |
| Active ingredient kg/ha | 0.25+ 1.25 | 1.25+ 0.25 | 0.75+ 0.75 I+XIII | 1.0+ 5.0 | 5.0+ 1.0 | 3.0+ 3.0 | | | | |
| Oryza sativa | 0 | 0 | 0 | 30 | 6 | 15 | | | | |
| Alisma plantago | 100 | 100 | 100 | 100 | 100 | 100 | | | | |
| Bidens pilosa | 95 | 100 | 97 | 100 | 100 | 100 | | | | |
| Cyperus esculentus | 90 | 100 | 100 | 100 | 100 | 100 | | | | |
| Cyperus rotundus | 85 | 95 | 98 | 100 | 100 | 100 | | | | |

| Active ingredient kg/ha | 0.25+ 1.25 | 1.25+ 0.25 | II+XIII 0.75+ 0.75 | 1.0+ 5.0 | 5.0+ 1.0 | 3.0+ 3.0 |
|---|---|---|---|---|---|---|
| Oryza sativa | 0 | 0 | 0 | 35 | 5 | 12 |
| Alisma plantago | 100 | 100 | 100 | 100 | 100 | 100 |
| Bidens pilosa | 95 | 94 | 98 | 100 | 100 | 100 |
| Cyperus esculentus | 68 | 95 | 75 | 100 | 100 | 100 |
| Cyperus rotundus | 55 | 90 | 70 | 95 | 100 | 100 |
| Active ingredient kg/ha | 0.25+ 1.25 | 1.25+ 0.25 | III+XIII 0.75+ 0.75 | 1.0+ 5.0 | 5.0+ 1.0 | 3.0+ 3.0 |
| Oryza sativa | 0 | 0 | 0 | 30 | 7 | 12 |
| Alisma plantago | 100 | 100 | 100 | 100 | 100 | 100 |
| Bidens pilosa | 95 | 97 | 90 | 100 | 100 | 100 |
| Cyperus esculentus | 66 | 95 | 75 | 100 | 100 | 100 |
| Cyperus rotundus | 60 | 85 | 65 | 100 | 100 | 100 |
| Active ingredient kg/ha | 0.25+ 1.25 | 1.25+ 0.25 | IV+XIII 0.75+ 0.75 | 1.0+ 5.0 | 5.0+ 1.0 | 3.0+ 3.0 |
| Oryza sativa | 0 | 0 | 0 | 32 | 10 | 15 |
| Alisma plantago | 100 | 100 | 100 | 100 | 100 | 100 |
| Bidens pilosa | 100 | 100 | 97 | 100 | 100 | 100 |
| Cyperus esculentus | 70 | 100 | 80 | 100 | 100 | 100 |
| Cyperus rotundus | 60 | 100 | 70 | 95 | 100 | 100 |
| Active ingredient kg/ha | | | XV+I 5.0+1.0 | | | |
| Oryza sativa | | | 100 | | | |
| Alisma plantago | | | 100 | | | |
| Bidens pilosa | | | 100 | | | |
| Cyperus esculentus | | | 100 | | | |
| Cyperus rotundus | | | 100 | | | |

0 = no damage
100 = complete destruction

EXAMPLE 7

In the open, various plants were treated at a growth height of 0.5 to 10 cm with the following amounts of the following active ingredients and composition thereof in the form of granules:

I   3-isopropyl-2,1,3-benzothiadiazinone-(4)-2,2-dioxide, 0.25, 0.5, 0.75 and 1.0 kg/ha;
VIII   dimethylamine salt of 2-(2-methyl-4-chlorophenoxy)-propionic acid, 0.25, 0.5, 0.75 and 1.0 kg/ha;
IX   dimethylamine salt of 2-(2,4 dichlorophenoxy)-propionic acid, 0.25, 0.5, 0.75 and 1.0 kg/ha;
XI   dimethylamine salt of 2-methyl-4-chlorophenoxyacetic acid, 0.25, 0.5, 0.75 and 1.0 kg/ha;
I+VIII   0.25+0.25, 0.25+0.75 and 0.75+0.25 kg/ha;
I+IX   0.25+0.25, 0.25+0.75 and 0.75+0.25 kg/ha;
I+XI   0.25+0.25, 0.25+0.75 and 0.75+0.25 kg/ha.

After 2 to 3 weeks it was ascertained that the compositions had a better herbicidal action than their individual components, combined with the same good crop plant compatibility.

The results are given below:

| Active ingredient kg/ha | I 0.25 | 0.5 | 0.75 | 1.0 | VIII 0.25 | 0.5 | 0.75 | 1.0 |
|---|---|---|---|---|---|---|---|---|
| Triticum aestivum | 0 | 0 | 0 | 0 | 0 | 0 | 0 | 0 |
| Hordum vulgare | 0 | 0 | 0 | 0 | 0 | 0 | 0 | 0 |
| Secale cereale | 0 | 0 | 0 | 0 | 0 | 0 | 0 | 0 |
| Matricaria maritima | 10 | 30 | 35 | 40 | 10 | 15 | 20 | 25 |
| Galium aparine | 10 | 20 | 30 | 45 | 15 | 30 | 40 | 50 |
| Stellaria media | 10 | 20 | 35 | 50 | 20 | 35 | 40 | 45 |
| Lamium amplexicaule | 5 | 10 | 20 | 25 | 10 | 15 | 20 | 25 |
| Active ingredient kg/ha | IX 0.25 | 0.5 | 0.75 | 1.0 | XI 0.25 | 0.5 | 0.75 | 1.0 |
| Triticum aestivum | 0 | 0 | 0 | 0 | 0 | 0 | 0 | 0 |
| Hordeum vulgare | 0 | 0 | 0 | 0 | 0 | 0 | 0 | 0 |
| Secale cereale | 0 | 0 | 0 | 0 | 0 | 0 | 0 | 0 |
| Matricaria maritima | 15 | 20 | 25 | 40 | 5 | 10 | 15 | 25 |
| Galium aparine | 10 | 20 | 30 | 60 | 5 | 10 | 15 | 20 |
| Stellaria media | 15 | 30 | 40 | 55 | 10 | 15 | 18 | 20 |
| Lamium amplexicaule | 15 | 25 | 33 | 40 | 20 | 30 | 60 | 80 |

| Active ingredient kg/ha | I+VIII 0.25+ 0.25 | 0.75+ 0.25 | 0.25+ 0.75 | I+IX 0.25+ 0.25 | 0.75+ 0.25 | 0.25+ 0.75 |
|---|---|---|---|---|---|---|
| Triticum aestivum | 0 | 0 | 0 | 0 | 0 | 0 |
| Hordeum vulgare | 0 | 0 | 0 | 0 | 0 | 0 |
| Secale cereale | 0 | 0 | 0 | 0 | 0 | 0 |
| Marticaria maritima | 55 | 90 | 65 | 65 | 90 | 80 |
| Galium aparine | 60 | 80 | 85 | 55 | 75 | 75 |
| Stellaria media | 60 | 95 | 85 | 60 | 80 | 85 |
| Lamium amplexicaule | 50 | 65 | 60 | 60 | 70 | 85 |

| Active ingredient kg/ha | 0.25+0.25 | I+XI 0.75+0.25 | 0.25+0.75 |
|---|---|---|---|
| Triticum aestivum | 0 | 0 | 0 |
| Hordeum vulgare | 0 | 0 | 0 |
| Secale cereale | 0 | 0 | 0 |
| Matricaria maritima | 60 | 90 | 65 |
| Galium aparine | 50 | 70 | 60 |
| Stellaria media | 55 | 80 | 65 |
| Lamium amplexicaule | 60 | 80 | 95 |

0 = no damage
100 = complete destruction

EXAMPLE 8

In the greenhouse various plants were treated at a growth height of 2 to 18 cm with the following amounts of the following active ingredients and composition thereof as dispersions:

II  sodium salt of 3-isopropyl-2,1,3-benzothiadiazinone-(4)-2,2-dioxide, 0.25, 0.5, 0.75 and 1.0 kg/ha;
X  sodium salt of 2-(2,4-dichlorophenoxy)-propionic acid, 0.25, 0.5, 0.75 and 1.0 kg/ha;
II + X  0.25 + 0.25, 0.75 + 0.25 and 0.25 + 0.75 kg/ha.

After 2 to 3 weeks it was ascertained that the composition had a better herbicidal action than its individual components, combined with the same good crop plant compatibility.

The results of this experiment are given below:

| Active ingredient kg/ha | II 0.25 | 0.5 | 0.75 | 1.0 | X 0.25 | 0.5 | 0.75 | 1.0 |
|---|---|---|---|---|---|---|---|---|
| Triticum aestivum | 0 | 0 | 0 | 0 | 0 | 0 | 0 | 0 |
| Hordeum vulgare | 0 | 0 | 0 | 0 | 0 | 0 | 0 | 0 |
| Secale cereale | 0 | 0 | 0 | 0 | 0 | 0 | 0 | 0 |
| Matricaria maritima | 10 | 25 | 35 | 55 | 3 | 5 | 10 | 20 |
| Galium aparine | 15 | 30 | 40 | 60 | 15 | 35 | 40 | 50 |
| Stellaria media | 10 | 20 | 30 | 45 | 15 | 35 | 40 | 45 |
| Lamium amplexicaule | 5 | 10 | 15 | 25 | 10 | 15 | 20 | 45 |

| Active ingredient kg/ha | 0.25+0.25 | II + X 0.75+0.25 | 0.25+0.75 |
|---|---|---|---|
| Triticum aestivum | 0 | 0 | 0 |
| Hordeum vulgare | 0 | 0 | 0 |
| Secale cereale | 0 | 0 | 0 |
| Matricaria maritima | 55 | 75 | 60 |
| Galium aparine | 60 | 95 | 90 |
| Stellaria media | 60 | 88 | 85 |
| Lamium amplexicaule | 50 | 60 | 60 |

0 = no damage
100 = complete destruction

III  dimethylamine salt of 3-isopropyl-2,1,3-benzothiadiazinone-(4)-2,2-dioxide, 0.25, 0.5, 0.75 and 1.0 kg/ha;
V  isooctyl 2-(2,4-dichlorophenoxy)-propionate, 0.25, 0.5, 0.75 and 1.0 kg/ha;
VI  dimethylamine salt of 2,4,5-trichlorophenoxyacetic acid, 0.25, 0.5, 0.75 and 1.0 kg/ha;
VII  dimethylamine salt of 2,4-dichlorophenoxyacetic acid, 0.25, 0.5, 0.75 and 1.0 kg/ha;
VIII  dimethylamine salt of 2-(2-methyl-4-chlorophenoxy)-propionic acid, 0.25, 0.5, 0.75 and 1.0 kg/ha;
XI  dimethylamine salt of 2-methyl-4-chlorophenoxyacetic acid, 0.25, 0.5, 0.75 and 1.0 kg/ha;

III + V   0.25 + 0.25, 0.25 + 0.75 and 0.75 + 0.25 kg/ha;
III + VI   0.25 + 0.25, 0.25 + 0.75 and 0.75 + 0.25 kg/ha;
III + VII   0.25 + 0.25, 0.25 + 0.75 and 0.75 + 0.25 kg/ha;
III + VIII   0.25 + 0.25, 0.25 + 0.75 and 0.75 + 0.25 kg/ha;
III + XI   0.25 + 0.25, 0.25 + 0.75 and 0.75 + 0.25 kg/ha.

EXAMPLE 9

In the open various plants were treated at a growth height of 2 to 18 cm with the following amounts of the following active ingredients and compositions thereof as emulsions:

After 2 to 3 weeks it was ascertained that the compositions had a better herbicidal action than their individual components, combined with the same good crop plant compatibility.

The results are given below:

| Active ingredient kg/ha | III 0.25 | 0.5 | 0.75 | 1.0 | V 0.25 | 0.5 | 0.75 | 1.0 |
|---|---|---|---|---|---|---|---|---|
| Triticum aestivum | 0 | 0 | 0 | 0 | 0 | 0 | 0 | 0 |
| Hordeum vulgare | 0 | 0 | 0 | 0 | 0 | 0 | 0 | 0 |
| Secale cereale | 0 | 0 | 0 | 0 | 0 | 0 | 0 | 0 |
| Matricaria maritima | 15 | 30 | 45 | 65 | 10 | 25 | 30 | 45 |
| Galium aparine | 20 | 30 | 40 | 50 | 20 | 35 | 50 | 70 |
| Stellaria media | 10 | 20 | 35 | 50 | 15 | 25 | 35 | 50 |
| Lamium amplexicaule | 5 | 10 | 20 | 40 | 20 | 30 | 45 | 55 |

| Active ingredient kg/ha | VI 0.25 | 0.5 | 0.75 | 1.0 | VII 0.25 | 0.5 | 0.75 | 1.0 |
|---|---|---|---|---|---|---|---|---|
| Triticum aestivum | 0 | 0 | 0 | 0 | 0 | 0 | 0 | 0 |
| Hordeum vulgare | 0 | 0 | 0 | 0 | 0 | 0 | 0 | 0 |
| Secale cereale | 0 | 0 | 0 | 0 | 0 | 0 | 0 | 0 |
| Matricaria maritima | 10 | 20 | 40 | 55 | 10 | 20 | 30 | 40 |
| Galium aparine | 15 | 30 | 45 | 70 | 5 | 10 | 15 | 20 |
| Stellaria media | 5 | 10 | 16 | 20 | 3 | 5 | 8 | 10 |
| Lamium amplexicaule | 20 | 40 | 60 | 85 | 20 | 35 | 55 | 80 |

| Active ingredient kg/ha | VIII 0.25 | 0.5 | 0.75 | 1.0 | XI 0.25 | 0.5 | 0.75 | 1.0 |
|---|---|---|---|---|---|---|---|---|
| Triticum aestivum | 0 | 0 | 0 | 0 | 0 | 0 | 0 | 0 |
| Hordeum vulgare | 0 | 0 | 0 | 0 | 0 | 0 | 0 | 0 |
| Secale cereale | 0 | 0 | 0 | 0 | 0 | 0 | 0 | 0 |
| Matricaria maritima | 10 | 15 | 20 | 25 | 5 | 10 | 15 | 25 |
| Galium aparine | 15 | 30 | 40 | 50 | 5 | 10 | 15 | 20 |
| Stellaria media | 20 | 35 | 40 | 45 | 10 | 15 | 18 | 20 |
| Lamium amplexicaule | 10 | 15 | 20 | 25 | 20 | 30 | 60 | 80 |

| Active ingredient kg/ha | III + V 0.25+0.25 | 0.75+0.25 | 0.25+0.75 | III + VI 0.25+0.25 | 0.75+0.25 | 0.25+0.75 |
|---|---|---|---|---|---|---|
| Triticum aestivum | 0 | 0 | 0 | 0 | 0 | 0 |
| Hordeum vulgare | 0 | 0 | 0 | 0 | 0 | 0 |
| Secale cereale | 0 | 0 | 0 | 0 | 0 | 0 |
| Matricaria maritima | 65 | 95 | 80 | 63 | 80 | 90 |
| Galium aparine | 80 | 98 | 100 | 65 | 90 | 97 |
| Stellaria media | 70 | 90 | 80 | 60 | 86 | 70 |
| Lamium amplexicaule | 66 | 75 | 90 | 65 | 70 | 95 |

| Active ingredient kg/ha | III + VII 0.25+0.25 | 0.75+0.25 | 0.25+0.75 | III + VIII 0.25+0.25 | 0.75+0.25 | 0.25+0.75 |
|---|---|---|---|---|---|---|
| Triticum aestivum | 0 | 0 | 0 | 0 | 0 | 0 |
| Hordeum vulgare | 0 | 0 | 0 | 0 | 0 | 0 |
| Secale cereale | 0 | 0 | 0 | 0 | 0 | 0 |
| Matricaria maritima | 65 | 100 | 80 | 65 | 95 | 70 |
| Galium aparine | 60 | 85 | 70 | 70 | 100 | 95 |
| Stellaria media | 40 | 77 | 55 | 65 | 100 | 85 |
| Lamium amplexicaule | 75 | 80 | 95 | 50 | 70 | 60 |

| Active ingredient kg/ha | 0.25+0.25 | III + XI 0.75+0.25 | 0.25+0.75 |
|---|---|---|---|
| Triticum aestivum | 0 | 0 | 0 |
| Hordeum vulgare | 0 | 0 | 0 |
| Secale cereale | 0 | 0 | 0 |
| Matricaria maritima | 65 | 85 | 75 |
| Galium aparine | 60 | 80 | 70 |
| Stellaria media | 55 | 85 | 65 |
| Lamium amplexicaule | 75 | 75 | 95 |

0 = no damage
100 = complete destruction

EXAMPLE 10

In the open various plants were treated at a growth height of 2 to 25 cm with the following amounts of the following active ingredients and composition thereof as an aqueous solution:

III dimethylamine salt of 3-iospropyl-2,1,3-benzothiadiazinone-(4)-2,2-dioxide, 0.25, 0.5, 0.75 and 1.0 kg/ha;

IX dimethylamine salt of 2-(2,4-dichlorophenoxy)-propionic acid, 0.25, 0.5, 0.75 and 1.0 kg/ha;

III + IX  0.25 + 0.25, 0.25 + 0.75 and 0.75 + 0.25 kg/ha.

After 2 to 3 weeks it was ascertained that the composition had a better herbicidal action than its individual components, combined with the same good crop plant compatibility.

The results of this experiment are given below:

| Active ingredient kg/ha | III 0.25 | 0.5 | 0.75 | 1.0 | IX 0.25 | 0.5 | 0.75 | 1.0 |
|---|---|---|---|---|---|---|---|---|
| Zea mays | 0 | 0 | 0 | 0 | 0 | 0 | 0 | 0 |
| Galium aparine | 20 | 30 | 40 | 50 | 10 | 20 | 30 | 65 |
| Matricaria maritima | 15 | 30 | 45 | 65 | 15 | 25 | 25 | 40 |
| Lamium amplexicaule | 5 | 10 | 20 | 40 | 15 | 25 | 35 | 60 |
| Cyperus difformis | 10 | 25 | 40 | 60 | 10 | 20 | 28 | 35 |
| Cyperus rotundus | 10 | 18 | 30 | 45 | 5 | 10 | 18 | 25 |

| Active ingredient kg/ha | 0.25+0.25 | III + IX 0.75+0.25 | 0.25 + 0.75 |
|---|---|---|---|
| Zea mays | 0 | 0 | 0 |
| Galium aparine | 65 | 85 | 90 |
| Matricaria maritima | 70 | 95 | 95 |
| Laminum amplexicaule | 60 | 70 | 90 |
| Cyperus difformis | 60 | 85 | 80 |
| Cyperus rotundus | 50 | 70 | 60 |

0 = no damage
100 = complete destruction

EXAMPLE 11

In the greenhouse various plants were treated at a growth height of 2 to 20 cm with the following amounts of the following active ingredients and composition thereof as pastes:

| | |
|---|---|
| III | dimethylamine salt of 3-isoproppyl-2,1,3-benzothiadiaminone-(4)-2,2-dioxide, 0.25, 0.5, 0.75 and 1.0 kg/ha; |
| X | sodium salt of 2-(2,4-dichlorophenoxy)-propionic acid, 0.25, 0.5, 0.75 and 1.0 kg/ha; |
| III + X | 0.25 + 0.25, 0.25 + 0.75 and 0.75 + 0.25 kg/ha. |

After 2 to 3 weeks it was ascertained that the composition had a better herbicidal action than its individual components, combined with the same good crop plant compatibility.

The results are given below:

EXAMPLE 12

In the greenhouse various plants were treated at a growth height of 2 to 22 cm with the following amounts of the following active ingredients and composition thereof as dusts:

| | |
|---|---|
| III | dimethylamine salt of 3-isopropyl-2,1,3-benzothiadiazinone-(4)-2,2-dioxide, 0.25, 0.5, 0.75 and 1.0 kg/ha; |
| XII | sodium salt of 2,4-dichlorophenoxyacetic acid, 0.25, 0.5, 0.75 and 1.0 kg/ha; |
| III + XII | 0.25 + 0.25, 0.25 + 0.75 and 0.75 + 0.25 kg/ha. |

After 2 to 3 weeks it was ascertained that the composition had a better herbicidal action than its individual components, combined with the same good crop plant compatibility.

The results are given below:

| Active ingredient kg/ha | III | | | | X | | | |
|---|---|---|---|---|---|---|---|---|
| | 0.25 | 0.5 | 0.75 | 1.0 | 0.25 | 0.5 | 0.75 | 1.0 |
| Triticum aestivum | 0 | 0 | 0 | 0 | 0 | 0 | 0 | 0 |
| Hordeum vulgare | 0 | 0 | 0 | 0 | 0 | 0 | 0 | 0 |
| Secale cereale | 0 | 0 | 0 | 0 | 0 | 0 | 0 | 0 |
| Anthemis arvensis | 20 | 30 | 40 | 60 | 5 | 10 | 15 | 20 |
| Chenopodium album | 25 | 30 | 50 | 70 | 20 | 30 | 45 | 60 |
| Chrysanthemum segetum | 20 | 30 | 40 | 70 | 10 | 20 | 27 | 30 |
| Lamium amplexicaule | 10 | 15 | 30 | 40 | 10 | 15 | 20 | 45 |

| Active ingredient kg/ha | III + X | | |
|---|---|---|---|
| | 0.25+0.25 | 0.75+0.25 | 0.25+0.75 |
| Triticum aestivum | 0 | 0 | 0 |
| Hordeum vulgare | 0 | 0 | 0 |
| Secale cereale | 0 | 0 | 0 |
| Anthemis arvensis | 60 | 80 | 70 |
| Chenopoddium album | 80 | 100 | 100 |
| Chrysanthemum segetum | 70 | 85 | 84 |
| Lamium amplexicaule | 55 | 75 | 70 |

0 = no damage, 100 = complete destruction

| Active ingredient kg/ha | III | | | | XII | | | |
|---|---|---|---|---|---|---|---|---|
| | 0.25 | 0.5 | 0.75 | 1.0 | 0.25 | 0.5 | 0.75 | 1.0 |
| Triticum aestivum | 0 | 0 | 0 | 0 | 0 | 0 | 0 | 0 |
| Hordeum vulgare | 0 | 0 | 0 | 0 | 0 | 0 | 0 | 0 |
| Secale cereale | 0 | 0 | 0 | 0 | 0 | 0 | 0 | 0 |
| Anthemis arvensis | 20 | 30 | 40 | 60 | 10 | 15 | 20 | 30 |
| Chenopodium album | 25 | 30 | 50 | 70 | 15 | 30 | 40 | 55 |
| Chrysanthemum segetum | 20 | 30 | 40 | 70 | 10 | 15 | 20 | 30 |
| Lamium amplexicaule | 10 | 15 | 30 | 40 | 15 | 20 | 35 | 45 |

| Active ingredient kg/ha | III + XII | | |
|---|---|---|---|
| | 0.25+0.25 | 0.75+0.25 | 0.25+0.75 |
| Triticum aestivum | 0 | 0 | 0 |
| Hordeum vulgare | 0 | 0 | 0 |
| Secale cereale | 0 | 0 | 0 |
| Anthemis arvensis | 65 | 85 | 80 |
| Chenopodium album | 75 | 95 | 88 |
| Chrysanthemum segetum | 67 | 85 | 75 |
| Lamium amplexicaule | 60 | 87 | 85 |

0 = no damage
100 = complete destruction

EXAMPLE 13

In the greenhouse various plants werre treated at a growth height of 3 to 15 cm with the following amounts of the following active ingredients and composition thereof as dispersions:

- III dimethylamine salt of 3-isopropyl-2,1,3-benzothiadiazinone-(4)-2,2-dioxide, 0.25, 0.5, 0.75 and 1.0 kg/ha;
- XIV diethanolamine salt of 2-methyl-4-chlorophenoxy-propionic acid, 0.25, 0.5, 0.75 and 1.0 kg/ha;

III + XIV 0.25 + 0.25, 0.25 + 0.75 and 0.75 + 0.25 kg/ha.

After 2 to 3 weeks it was ascertained that the composition had a better herbicidal action than its individual components, combined with the same good crop plant compatibility.

The results are given below:

| Active ingredient kg/ha | III | | | | XIV | | | |
|---|---|---|---|---|---|---|---|---|
| | 0.25 | 0.5 | 0.75 | 1.0 | 0.25 | 0.5 | 0.75 | 1.0 |
| Festuca app. | 0 | 0 | 0 | 0 | 0 | 0 | 0 | 0 |
| Lolium spp. | 0 | 0 | 0 | 0 | 0 | 0 | 0 | 0 |
| Poa spp. | 0 | 0 | 0 | 0 | 0 | 0 | 0 | 0 |
| Ranunculus spp. | 10 | 15 | 20 | 25 | 20 | 30 | 35 | 45 |
| Rumex acetosa | 5 | 10 | 15 | 20 | 15 | 20 | 27 | 35 |

| Active ingredient kg/ha | III + XIV | | |
|---|---|---|---|
| | 0.25+0.25 | 0.75+0.25 | 0.25+0.75 |
| Festuca spp. | 0 | 0 | 0 |
| Lolium spp. | 0 | 0 | 0 |
| Poa spp. | 0 | 0 | 0 |
| Ranunculus spp. | 65 | 80 | 90 |
| Rumex acetosa | 60 | 70 | 65 |

0 = no damage
100 = complete destruction.

EXAMPLE 14

In the open, various plants were treated at a growth height of 2 to 19 cm with the following amounts of the following active ingredients and compositions thereof as spray solutions:

- IV diethanolamine salt of 3-isopropyl-2,1,3-benzothiadiazinone-(4)-2,2-dioxide, 0.25, 0.5, 0.75 and 1.0 kg/ha;
- VI dimethylamine salt of 2,4,5-trichlorophenoxyacetic acid, 0.25, 0.5, 0.75 and 1.0 kg/ha;
- VII dimethylamine salt of 2,4-dichlorophenoxyacetic acid, 0.25, 0.5, 0.75 and 1.0 kg/ha;
- VIII dimethylamine salt of 2-(2-methyl-4-chlorophenoxy)-propionic acid, 0.25, 0.5, 0.75 and 1.0 kg/ha;
- IX dimethylamine salt of 2-(2,4-dichlorophenoxy)-propionic acid, 0.25, 0.5, 0.75 and 1.0 kg/ha;
- XI diemthylamine salt of 2-methyl-4-chlorophenoxyacetic acid, 0.25, 0.5, 0.75 and 1.0 kg/ha;

IV + VI 0.25 + 0.25, 0.25 + 0.75 and 0.75 + 0.25 kg/ha;
IV + VII 0.25 + 0.25, 0.25 + 0.75 and 0.75 + 0.25 kg/ha;
IV + VIII 0.25 + 0.25, 0.25 + 0.75 and 0.75 + 0.25 kg/ha;
IV + IX 0.25 + 0.25, 0.25 + 0.75 and 0.75 + 0.25 kg/ha;
IV + XI 0.25 + 0.25, 0.25 + 0.75 and 0.75 + 0.25 kg/ha;

After 2 to 3 weeks it was ascetained that the compositions had a better herbicidal action than their individual components, combined with the same good crop plant compatibility.

The results are given below:

| Active ingredient kg/ha | IV | | | | VI | | | |
|---|---|---|---|---|---|---|---|---|
| | 0.25 | 0.5 | 0.75 | 1.0 | 0.25 | 0.5 | 0.75 | 1.0 |
| Hordeum vulgare | 0 | 0 | 0 | 0 | 0 | 0 | 0 | 0 |
| Triticum aestivum | 0 | 0 | 0 | 0 | 0 | 0 | 0 | 0 |
| Secale cereale | 0 | 0 | 0 | 0 | 0 | 0 | 0 | 0 |
| Matricaria maritima | 15 | maritima | 50 | 70 | 10 | 20 | 40 | 55 |
| Galium aparine | 25 | 35 | 45 | 65 | 15 | 30 | 45 | 70 |
| Stellaria media | 10 | 20 | 40 | 60 | 5 | 10 | 16 | 20 |
| Lamium amplexicaule | 6 | 15 | 25 | 35 | 20 | 40 | 60 | 85 |

| Active ingredient kg/ha | VII | | | | VIII | | | |
|---|---|---|---|---|---|---|---|---|
| | 0.25 | 0.5 | 0.75 | 1.0 | 0.25 | 0.5 | 0.75 | 1.0 |
| Hordeum vulgare | 0 | 0 | 0 | 0 | 0 | 0 | 0 | 0 |
| Triticum aestivum | 0 | 0 | 0 | 0 | 0 | 0 | 0 | 0 |
| Secale cereale | 0 | 0 | 0 | 0 | 0 | 0 | 0 | 0 |
| Matricaria moritima | 10 | 20 | 30 | 40 | 10 | 15 | 20 | 25 |
| Galium aparine | 5 | 10 | 15 | 20 | 15 | 30 | 40 | 50 |
| Stellaria media | 3 | 5 | 8 | 10 | 20 | 35 | 40 | 45 |
| Lamium amplexicaule | 20 | 35 | 55 | 80 | 10 | 15 | 20 | 25 |

| Active ingredient kg/ha | IX | | | | XI | | | |
|---|---|---|---|---|---|---|---|---|
| | 0.25 | 0.5 | 0.75 | 1.0 | 0.25 | 0.5 | 0.75 | 1.0 |
| Hordeum vulgare | 0 | 0 | 0 | 0 | 0 | 0 | 0 | 0 |
| Triticum aestivum | 0 | 0 | 0 | 0 | 0 | 0 | 0 | 0 |
| Secale cereale | 0 | 0 | 0 | 0 | 0 | 0 | 0 | 0 |
| Matricaria maritima | 15 | 20 | 25 | 40 | 5 | 10 | 15 | 25 |
| Galium aparine | 10 | 20 | 30 | 65 | 5 | 10 | 15 | 20 |
| Stellaria media | 15 | 30 | 40 | 55 | 10 | 15 | 18 | 20 |
| Lamium amplexicaule | 15 | 25 | 35 | 60 | 20 | 30 | 60 | 80 |

| Active ingredient kg/ha | IV + VI 0.25+0.25 | 0.75+0.25 | 0.25+0.75 |
|---|---|---|---|
| Hordeum vulgare | 0 | 0 | 0 |
| Triticum aestivum | 0 | 0 | 0 |
| Secale cereale | 0 | 0 | 0 |
| Matricaria maritima | 65 | 95 | 92 |
| Galium aparine | 75 | 98 | 100 |
| Stellaria media | 60 | 90 | 65 |
| Lamium amplexicaule | 65 | 85 | 95 |

| Active ingredient kg/ha | IV + VII 0.25+0.25 | 0.75+0.25 | 0.25+0.75 |
|---|---|---|---|
| Hordeum vulgare | 0 | 0 | 0 |
| Triticum aestivum | 0 | 0 | 0 |
| Secale cereale | 0 | 0 | 0 |
| Matricaria maritima | 70 | 98 | 100 |
| Galium aparine | 70 | 85 | 80 |
| Stellaria media | 60 | 80 | 60 |
| Lamium amplexicaule | 60 | 85 | 95 |

| Active ingredient kg/ha | IV + VIII 0.25+0.25 | 0.75+0.25 | 0.25+0.75 |
|---|---|---|---|
| Hordeum vulgare | 0 | 0 | 0 |
| Triticum aestivum | 0 | 0 | 0 |
| Secale cereale | 0 | 0 | 0 |
| Matricaria maritima | 70 | 95 | 75 |
| Galium aparine | 80 | 100 | 100 |
| Stellaria media | 70 | 98 | 90 |
| Lamium amplexicaule | 55 | 65 | 67 |

| Active ingredient kg/ha | IV +IX 0.25+0.25 | 0.75+0.25 | 0.25+0.75 |
|---|---|---|---|
| Hordeum vulgare | 0 | 0 | 0 |
| Triticum aestivum | 0 | 0 | 0 |
| Secale cereale | 0 | 0 | 0 |
| Matricaria maritima | 75 | 100 | 95 |
| Galium apareine | 75 | 95 | 95 |
| Stellaria media | 65 | 90 | 90 |
| Lamium amplexicaule | 60 | 85 | 90 |

| Active ingredient kg/ha | IV + XI 0.25+0.25 | 0.75+0.25 | 0.25+0.75 |
|---|---|---|---|
| Hordeum vulgare | 0 | 0 | 0 |
| Triticum aestivum | 0 | 0 | 0 |
| Secale cereale | 0 | 0 | 0 |
| Matricaria maritima | 60 | 95 | 70 |
| Galium aparine | 70 | 90 | 85 |
| Stellaria media | 65 | 95 | 70 |
| Lamium amplexicaule | 70 | 85 | 95 |

0 = no damage
100 = complete destruction

EXAMPLE 15

In the open, various plants were treated at a growth height of 2 to 20 cm with the following amounts of the following active ingredients and compositions thereof as aqueous solutions:

IV   diethanolamine salt of 3-isopropyl-2,1,3-benzothiadiazinone-(4)-2,2-dioxide, 1.0, 2.0, 3.0 and 4.0 kg/ha;

VI   dimethylamine salt of 2,4,5-trichlorophenoxyacetic acid, 1.0, 2.0, 3.0 and 4.0 kg/ha;

VII   dimethylamine salt of 2,4-dichlorophenoxyacetic acid, 1.0, 2.0, 3.0 and 4.0 kg/ha;

VIII   dimethylamine salt of 2-(2-methyl-4-chlorophenoxy)-propionic acid, 1.0, 2.0, 3.0 and 4.0 kg/ha;

IX   dimethylamine salt of 2-(2,4-dichlorophenoxy)-propionic acid, 1.0, 2.0, 3.0 and 4.0 kg/ha;

XI   dimethylamine salt of 2-methyl-4-chlorophenoxyacetic acid, 1.0, 2.0, 3.0 and 4.0 kg/ha;

IV + VI   3.0 + 1.0, 1.0 + 3.0 and 1.0 + 1.0 kg/ha;
IV + VII   3.0 + 1.0, 1.0 + 3.0 and 1.0 + 1.0 kg/ha;
IV + VIII   3.0 + 1.0, 1.0 + 3.0 and 1.0 + 1.0 kg/ha;
IV + IX   3.0 + 1.0, 1.0 + 3.0 and 1.0 + 1.0 kg/ha;
IV + XI   3.0 + 1.0, 1.0 + 3.0 and 1.0 + 1.0 kg/ha.

After 2 to 3 weeks it was ascertained that the compositions had better crop plant compatibility than active ingredients IV to IX and XI at the application rate of 4 kg/ha.

The results of this experiment are given below:

| Active ingredient kg/ha | IV 1.0 | 2.0 | 3.0 | 4.0 | VI 1.0 | 2.0 | 3.0 | 4.0 |
|---|---|---|---|---|---|---|---|---|
| Triticum aestivum | 0 | 0 | 0 | 0 | 0 | 0 | 10 | 25 |
| Matricaria maritima | 70 | 100 | 100 | 100 | 55 | 100 | 100 | 100 |
| Lamium amplexicaule | 35 | 70 | 75 | 80 | 85 | 100 | 100 | 100 |

| Active ingredient kg/ha | VII 1.0 | 2.0 | 3.0 | 4.0 | VII 1.0 | 2.0 | 3.0 | 4.0 |
|---|---|---|---|---|---|---|---|---|
| Triticum aestivum | 0 | 0 | 5 | 20 | 0 | 0 | 5 | 20 |
| Matricaria maritima | 40 | 70 | 95 | 100 | 25 | 40 | 60 | 80 |
| Lamium amplexicaule | 80 | 90 | 100 | 100 | 25 | 60 | 70 | 95 |

-Continued

| Active ingredient | IX | | | | XI | | | |
|---|---|---|---|---|---|---|---|---|
| kg/ha | 1.0 | 2.0 | 3.0 | 4.0 | 1.0 | 2.0 | 3.0 | 4.0 |
| Triticum aestivum | 0 | 5 | 15 | 20 | 0 | 0 | 10 | 25 |
| Matricaria maritima | 40 | 80 | 90 | 100 | 25 | 40 | 60 | 70 |
| Lamium amplexicaule | 60 | 85 | 90 | 100 | 80 | 95 | 100 | 100 |

| Active ingredient | IV + VI | | |
|---|---|---|---|
| kg/ha | 3.0+1.0 | 1.0+3.0 | 1.0+1.0 |
| Triticum aestivum | 0 | 10 | 0 |
| Matricaria maritima | 100 | 100 | 100 |
| Lamium amplexicaule | 100 | 100 | 100 |

| Active ingredient | IV + VII | | |
|---|---|---|---|
| kg/ha | 3.0+1.0 | 1.0+3.0 | 1.0+1.0 |
| Triticum aestivum | 0 | 5 | 0 |
| Matricaria maritima | 100 | 100 | 100 |
| Lamium amplexicaule | 100 | 100 | 100 |

| Active ingredient | IV + VIII | | |
|---|---|---|---|
| kg/ha | 3.0+1.0 | 1.0+3.0 | 1.0+1.0 |
| Triticum aestivum | 0 | 5 | 0 |
| Matricaria maritima | 100 | 100 | 100 |
| Lamium amplexicaule | 100 | 100 | 95 |

| Active ingredient | IV + IX | | |
|---|---|---|---|
| kg/ha | 3.0+1.0 | 1.0+3.0 | 1.0+1.0 |
| Triticum aestivum | 0 | 15 | 0 |
| Matricaria maritima | 100 | 100 | 100 |
| Lamium amplexicaule | 100 | 100 | 100 |

| Active ingredient | IV + XI | | |
|---|---|---|---|
| kg/ha | 3.0+1.0 | 1.0+3.0 | 1.0+1.0 |
| Triticum aestivum | 0 | 10 | 0 |
| Matricaria maritima | 100 | 100 | 100 |
| Lamium amplexicaule | 100 | 100 | 100 |

0 = damage
100 = complete destruction

EXAMPLE 16

In the greenhouse, various plants were treated at a growth height of 2 to 20 cm with the following amounts of the following active ingredients and compositions thereof in the form of granules:

IV diethanolamine salt of 3-isopropyl-2,1,3-benzothiadiazinone(4)-2,2-dioxide,
0.25, 0.5, 0.75, 1.0, 2.0, 3.0 and 4.0 kg/ha;
XIII potassium salt of 2,4,5-trichlorophenoxypropionic acid,
0.25, 0.5, 0.75, 1.0, 2.0, 3.0 and 4.0 kg/ha;
IV + XIII 0.25 + 0.25, 0.25 + 0.75, 0.75 + 0.25, 3.0 + 1.0,
1.0 + 3.0 and 1.0 + 1.0 kg/ha.

After 2 to 3 weeks it was ascertained that the composition, at the application rates 0.25 + 0.25, 0.25 + 0.75 and 0.75 + 0.25 kg/ha, had the same crop plant compatibility as, and a better herbicidal action than, active ingredient IV at the application rate of 4 kg/ha and active ingredient XIII up to 1.0 kg/ha. The composition, at the application rates of 3.0 + 1.0, 1.0 + 3.0 and 1.0 + 1.0 kg/ha, had better crop plant compatibility than XII at 4.0 kg/ha.

The results of this experiment are given below:

| Active ingredient | IV | | | | | | |
|---|---|---|---|---|---|---|---|
| kg/ha | 0.25 | 0.5 | 0.75 | 1.0 | 2.0 | 3.0 | 4.0 |
| Oryza sativa | 0 | 0 | 0 | 0 | 0 | 0 | 0 |
| Bidens pilosa | 20 | 30 | 40 | 50 | 85 | 100 | 100 |
| Cyperus esculentus | 15 | 25 | 35 | 50 | 75 | 90 | 100 |
| Cyperus rotundus | 10 | 20 | 30 | 40 | 80 | 98 | 100 |
| Alisma plantago | 35 | 40 | 50 | 55 | 80 | 80 | 95 |

| Active ingredient | XIII | | | | | | |
|---|---|---|---|---|---|---|---|
| kg/ha | 0.25 | 0.5 | 0.75 | 1.0 | 2.0 | 3.0 | 4.0 |
| Oryza sativa | 0 | 0 | 0 | 0 | 5 | 10 | 25 |
| Bidens pilosa | 10 | 20 | 25 | 30 | 50 | 80 | 100 |
| Cyperus esculentus | 2 | 5 | 8 | 10 | 15 | 18 | 30 |
| Cyperus rotundus | 0 | 2 | 5 | 5 | 10 | 12 | 20 |
| Alisma plantago | 15 | 25 | 40 | 50 | 60 | 75 | 90 |

| Active ingredient | IV + XIII | | |
|---|---|---|---|
| kg/ha | 0.25 +0.25 | 0.75 +0.25 | 0.25 +0.75 |
| Oryza sativa | 0 | 0 | 0 |
| Bidens pilosa | 65 | 90 | 80 |
| Cyperus esculentus | 55 | 75 | 60 |
| Cyperus rotundus | 40 | 65 | 50 |
| Alisma plantage | 80 | 95 | 100 |

| Active ingredient kg/ha | 3.0+1.0 | IV + XIII 1.0+3.0 | 1.0+1.0 |
|---|---|---|---|
| Oryza sativa | 0 | 10 | 0 |
| Bidens pilosa | 100 | 100 | 100 |
| Cyperus esculentus | 100 | 100 | 95 |
| Cyperus rotundus | 100 | 95 | 90 |
| Alisma plantago | 100 | 100 | 100 |

0 = no damage
100 = complete destruction

EXAMPLE 17

In the greenhouse various plants were treated at a growth height of 2 to 25 cm with the following amounts of the following active ingredients and compositions thereof as aqueous solutions:

IV  diethanolamine salt of 3-isopropyl-2,1,3-benzothiadiazinone-(4)-2,2-dioxide, 0.25, 0.5, 0.75 and 1.0 kg/ha;
VIII  dimethylamine salt of 2-(2-methyl-4-chlorophenoxy)-propionic acid, 0.25, 0.5, 0.75 and 1.0 kg/ha;
IX  dimethylamine salt of 2-(2,4-dichlorophenoxy)-propionic acid, 0.25, 0.5, 0.75 and 1.0 kg/ha;
XI  dimethylamine salt of 2-methyl-4-chlorophenoxyacetic acid, 0.25, 0.5, 0.75 and 1.0 kg/ha;
IV + VIII  0.25 + 0.25, 0.25 + 0.75 and 0.75 + 0.25 kg/ha;
IV + IX  0.25 + 0.25, 0.25 + 0.75 and 0.75 + 0.25 kg/ha;
IV + XI  0.25 + 0.25, 0.25 + 0.75 and 0.75 + 0.25 kg/ha.

After 2 to 3 weeks it was ascertained that the compositions had a better herbicidal action than their individual components, combined with the same good crop plant compatibility.

The results are given below:

I claim:

1. A selective herbicide composition containing a herbicidally effective amount of a mixture of
   a. a compound having the formula

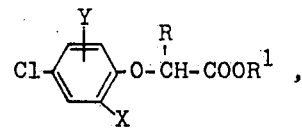

where X denotes chlorine or methyl, Y denotes chlorine or hydrogen, R denotes hydrogen or methyl, $R^1$ denotes hydrogen, an alkyl radical or an alkoxy alkyl radical, or a carboxylic acid salt thereof and
   b. a compound having the formula

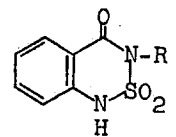

where R denotes methyl, ethyl, propyl or isopropyl, or

| Active ingredient kg/ha | IV | | | | VIII | | | |
|---|---|---|---|---|---|---|---|---|
| | 0.25 | 0.5 | 0.75 | 1.0 | 0.25 | 0.5 | 0.75 | 1.0 |
| Zea mays | 0 | 0 | 0 | 0 | 0 | 0 | 0 | 0 |
| Galium aparine | 25 | 35 | 45 | 65 | 15 | 30 | 40 | 50 |
| Matricaria maritima | 15 | 35 | 50 | 70 | 10 | 15 | 20 | 25 |
| Lamium amplexicaule | 6 | 10 | 25 | 35 | 10 | 15 | 20 | 25 |
| Cyperus esculentus | 15 | 25 | 35 | 50 | 3 | 5 | 8 | 10 |
| Cyperus rotundus | 10 | 20 | 30 | 40 | 0 | 4 | 7 | 9 |

| Active ingredient kg/ha | IX | | | | XI | | | |
|---|---|---|---|---|---|---|---|---|
| | 0.25 | 0.5 | 0.75 | 1.0 | 0.25 | 0.5 | 0.75 | 1.0 |
| Zea mays | 0 | 0 | 0 | 0 | 0 | 0 | 0 | 0 |
| Galium aparine | 20 | 30 | 35 | 70 | 5 | 10 | 15 | 20 |
| Matricaria maritima | 15 | 20 | 25 | 40 | 5 | 10 | 15 | 25 |
| Lamium amplexicaule | 15 | 25 | 35 | 60 | 20 | 30 | 60 | 80 |
| Cyperus esculentus | 0 | 5 | 10 | 15 | 5 | 10 | 15 | 20 |
| Cyperus rotundus | 5 | 10 | 18 | 25 | 5 | 10 | 14 | 15 |

| Active ingredient kg/ha | IV + VIII | | |
|---|---|---|---|
| | 0.25 +0.25 | 0.75+0.25 | 0.25+0.75 |
| Zea mays | 0 | 0 | 0 |
| Galium aparine | 75 | 97 | 95 |
| Matricaria maritima | 70 | 98 | 75 |
| Lamium amplexicaule | 47 | 70 | 66 |
| Cyperus esculentus | 55 | 78 | 60 |
| Cyperus rotundus | 50 | 70 | 55 |

| Active ingredient kg/ha | IV + IX | | |
|---|---|---|---|
| | 0.25+0.25 | 0.75+0.25 | 0.25+0.75 |
| Zea mays | 0 | 0 | 0 |
| Galium aparine | 80 | 100 | 100 |
| Matricaria maritima | 70 | 95 | 90 |
| Lamium amplexicaule | 50 | 80 | 85 |
| Cyperus esculentus | 55 | 70 | 60 |
| Cyperus rotundus | 64 | 76 | 67 |

| Active ingredient kg/ha | IV + XI | | |
|---|---|---|---|
| | 0.25+0.25 | 0.75+0.25 | 0.25+0.75 |
| Zea mays | 0 | 0 | 0 |
| Galium aparine | 70 | 85 | 75 |
| Matricaria maritima | 65 | 95 | 70 |
| Lamium amplexicaule | 60 | 86 | 95 |
| Cyperus esculentus | 55 | 75 | 65 |
| Cyperus rotundus | 50 | 70 | 55 |

0 = no damage
100 = complete destruction a salt thereof in a weight ratio of 1:5 to 5:1.

2. A process for controlling the growth of unwanted plants among crop plants which comprises treating the loci of said plants with a herbicidally effective amount of a selective herbicide mixture of a. a compound having the formula

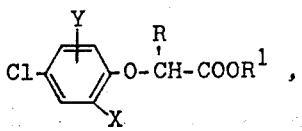

where X denotes chlorine or methyl, Y denotes chlorine or hydrogen, R denotes hydrogen or methyl, $R^1$ denotes hydrogen, an alkyl radical or an alkoxy radical, or a salt of carboxylic acid, and b. a compound having the formula

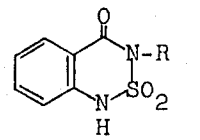

where R denotes methyl, ethyl, propyl or isoproypl, or a salt thereof in a weight ratio of 1:5 to 5:1.

3. A process as claimed in claim 2 wherein the weight ratio is 1:3 to 3:1.

4. A process as claimed in claim 2 wherein compound a is the dimethylamine salt of α-(2,4-dichlorophenoxy)-propionic acid, the dimethylamine salt of α-(2-methyl-4-chlorophenoxy)-propionic acid, 2,4-dichlorophenoxyacetic acid, the sodium salt of 2-methyl-4-chlorophenoxyacetic acid, isooctyl 2,4,5-trichlorophenoxypropionate, amyl 2,4,5-trichlorophenoxyacetate, the dimethylamine salt of 2,4-dichlorophenoxyacetic acid, the sodium salt of 2-(2,4-dichlorophenoxy)propionic acid, the sodium salt of 2,4-dichlorophenoxyacetic acid, the dimethylamine salt of 2,4,5-trichlorophenoxyacetic acid, the dimethylamine salt of 2-methyl-4-chlorophenoxyacetic acid, the diethanolamine salt of 2-(2-methyl-4-chlorophenoxy)-propionic acid, isooctyl 2-(2,4-dichlorophenoxy)-propionate, or potassium salt of 2,4,5-trichlorophenoxypropionic acid.

5. A process as claimed in claim 4 wherein compound b is 3-propyl-2,1,3-benzothiadiazinone-(4)-2,2-dioxide, 3-ethyl-2,1,3-benzothiadiazinone-(4)-2,2-dioxide, 2-methyl-2,1,3-benzothiadiazinone-(4)-2,2-dioxide, the sodium salt of 3-isopropyl-2,1,3-benzothiadiazinone-(4)-2,2-dioxide, the 2-chloroethyltrimethylammonium salt of 3-isopropyl-2,1,3-benzothiadiazinone-(4)-2,2-dioxide, the 2-chloroethyltrimethylammonium salt of 3-ethyl-2,1,3-benzothiadiazinone-(4)-2,2-dioxide, the triethylammonium salt of 3-propyl-2,1,3-benzothiadiazinone-(4)-2,2-dioxide, the sodium salt of 3-ethyl-2,1,3-benzothiadiazinone-(4)-2,2-dioxide, the sodium salt of 3-propyl-2,1,3-benzothiadiazinone-(4)-2,2-dioxide, 3-isobutyl-2,1,3-benzothiadiazinone-(4)-2,2-dioxide or 3-isopropyl-2,1,3-benzothiadiadiazinone-(4)-2,2-dioxide or the dimethylamine or diethanolamine salt thereof.

6. A composition as claimed in claim 1 wherein the weight ratio is 1:3 to 3:1.

7. A composition as claimed in claim 1 wherein compound a is the dimethylamine salt of α-(2,4-dichlorophenoxy)-propionic acid, the dimethylamine salt of α-(2-methyl-4-chlorophenoxy)-propionic acid, 2,4-dichlorophenoxyacetic acid, the sodium salt of 2-methyl-4-chlorophenoxyacetic acid, isooctyl 2,4,5-trichlorophenoxypropionate, amyl 2,4,5-trichlorophenoxyacetate, the dimethylamine salt of 2,4-(dichlorophenoxy)acetic acid, the sodium salt of 2-(2,4-dichlorophenoxy)propionic acid, the sodium salt of 2,4-dichlorophenoxyacetic acid, the dimethylamine salt of 2,4,5-trichlorophenoxyacetic acid, the dimethylamine salt of 2-methyl-4-chlorophenoxyacetic acid, the diethanolamine salt of 2-(2-methyl4-chlorophenoxy)-propionic acid, isooctyl 2-(2,4-dichlorophenoxy)propionate, or the potassium salt of 2,4,5-trichlorophenoxypropionic acid.

8. A composition as claimed in claim 7 wherein compound b is 3-propyl-2,1,3-benzothiadiazinone-(4)-2,2-dioxide, 2-ethyl-2,1,3-benzothiadiazinone-(4)-2,2-dioxide, 2-methyl-2,1,3benzothiadiazinone-(4)-2,2-dioxide, the sodium salt of 3-isopropyl-2,1,3-benzothiadiazinone-(4)-2,2-dioxide, the 2-chloroethyltrimethylammonium salt of 3-isopropyl-2,1,3benzothiadiazinone-(4)-2,2-dioxide, the 2-chloroethyltrimethylammonium salt of 3-ethyl-2,1,3-benzothiadiazinone-(4)-2,2-dioxide, the triethylammonium salt of 3-propyl-2,1,3-benzothiadiazinone(4)-2,2-dioxide, the sodium salt of 3-ethyl-2,1,3-benzothiadiazinone-(4)-2,2-dioxide, the sodium salt of 3-propyl-2,1,3benzothiadiazinone-(4)-2,2-dioxide, 3-isobutyl-2,1,3benzothiadiazinone-(4)-2,2-dioxide, or 3-isopropyl-2,1,3-benzo thiadiazinone-(4)-2,2-dioxide or the dimethylamine or diethanolamine salt thereof.

* * * * *